US012679461B2

(12) United States Patent
Yu et al.

(10) Patent No.: US 12,679,461 B2
(45) Date of Patent: Jul. 14, 2026

(54) VEHICLE BODY REINFORCING STRUCTURE AND VEHICLE

(71) Applicant: HONDA MOTOR CO., LTD., Tokyo (JP)

(72) Inventors: Jianli Yu, Guangdong (CN); Koji Yoshikawa, Guangdong (CN); Yao Yang, Guangdong (CN); Nobuo Aizawa, Guangdong (CN)

(73) Assignee: HONDA MOTOR CO., LTD., Tokyo (JP)

( * ) Notice: Subject to any disclaimer, the term of this patent is extended or adjusted under 35 U.S.C. 154(b) by 532 days.

(21) Appl. No.: 18/141,480

(22) Filed: May 1, 2023

(65) Prior Publication Data

US 2023/0365194 A1 Nov. 16, 2023

(30) Foreign Application Priority Data

May 12, 2022 (CN) .......................... 202210515973.3

(51) Int. Cl.
B62D 21/03 (2006.01)
B60K 1/04 (2019.01)

(52) U.S. Cl.
CPC ................ B62D 21/03 (2013.01); B60K 1/04 (2013.01)

(58) Field of Classification Search
CPC .................................. B62D 21/03; B60K 1/04
See application file for complete search history.

(56) References Cited

U.S. PATENT DOCUMENTS

| | | | | |
|---|---|---|---|---|
| 7,854,474 | B2 * | 12/2010 | Cox | |
| 8,585,132 | B2 * | 11/2013 | Klimek | |
| 8,932,769 | B2 * | 1/2015 | Ohashi | |
| 10,899,213 | B2 * | 1/2021 | Baccouche | |
| 11,104,381 | B2 * | 8/2021 | Ikeda | |
| 11,919,381 | B2 * | 3/2024 | Matsuoka | |

FOREIGN PATENT DOCUMENTS

CN 103429487 12/2013

\* cited by examiner

*Primary Examiner* — James A Shriver, II
*Assistant Examiner* — Nicholas R. Kandas
(74) *Attorney, Agent, or Firm* — Amin, Turocy & Watson, LLP

(57) ABSTRACT

A vehicle body reinforcing structure installed in a vehicle including a vehicle body and a battery pack provided in the vehicle body includes a first reinforcing member including at least a cross connection portion; and a second reinforcing member including at least a reinforcing portion arranged to extend along a longitudinal direction of a side surface of the battery pack, wherein both the first reinforcing member and the second reinforcing member are arranged along the longitudinal direction of the side surface of the battery pack, and the two ends of the first reinforcing member and the second reinforcing member are connected to the vehicle body respectively.

10 Claims, 7 Drawing Sheets

VEHICLE BODY REINFORCING STRUCTURE AND VEHICLE

CROSS-REFERENCE TO RELATED APPLICATION

The priority is claimed based on Chinese Patent Application No. 202210515973.3, filed May 12, 2022. The content of the Chinese Patent Application is incorporated herein by reference.

TECHNICAL FIELD

The present disclosure relates to a technical field of a vehicle. More specifically, the present disclosure relates to a vehicle body reinforcing structure and a vehicle.

RELATED ART

Conventionally, along with the rapid development of the vehicle industry, due to the advantages of fast response, energy saving and emission reduction, the electric vehicles are gradually gaining the recognition of more consumers. The power of the electric vehicles comes from the battery pack, which is usually arranged at the bottom portion of the vehicle. Due to the relatively large weight of the battery pack, the followability of the vehicle body is relatively poor when the vehicle turns so as to easily leads to the vehicle imbalance. Accordingly, it is necessary to improve the vehicle stiffness to ensure the followability of the vehicle at the time of turning.

In Chinese Patent Application, Publication No. 103429487A, a vehicle body front-side structure is disclosed, wherein a pair of front side members located inside the front compartment and extending in the front-rear direction of the vehicle body, a pair of strut towers that are arranged in the front compartment on both sides in the width direction of the front compartment and with the suspensions of the front wheels arranged therein, and a reinforcing member coupled to the upper portions of the strut towers and the front side members opposite to the strut towers and extending therebetween. According to the above-described vehicle body front-side structure, it is possible to improve the torsional rigidity and the transverse bending rigidity of the vehicle body.

However, there is a possibility that the vehicle imbalance occurs due to the lack of the rigidity in the vehicle body caused by the installation of the battery pack.

SUMMARY

In consideration of the above circumstances, an object of the present disclosure is to provide a vehicle body reinforcing structure for solving the technical issue that the vehicle imbalance may occur due to the lack of the rigidity in the vehicle body caused by the installation of the battery pack according to the conventional technology.

According to an aspect of the present disclosure, a vehicle body reinforcing structure installed in a vehicle including a vehicle body and a battery pack provided in the vehicle body is provided. The vehicle body reinforcing structure includes a first reinforcing member including at least a cross connection portion; and a second reinforcing member including at least a reinforcing portion arranged to extend along a longitudinal direction of a side surface of the battery pack, wherein both the first reinforcing member and the second reinforcing member are arranged along the longitudinal direction of the side surface of the battery pack, and the two ends of the first reinforcing member and the second reinforcing member are connected to the vehicle body respectively.

According to the above-described aspect, the first reinforcing member includes at least one cross connection portion and the second reinforcing member includes at least one reinforcing portion arranged to extend along a longitudinal direction of a side surface of the battery pack such that in a case in which the extending directions of the first reinforcing member and the second reinforcing member are the same with each other (that is, extending along the length direction of the side surface of the battery pack), the structural strength of the vehicle body is improved due to the general effect of the cross connection portion and the reinforcing portion. The first reinforcing member and the second reinforcing member are provided on the side surface of the battery pack respectively and connected with the vehicle body to reinforce the vehicle body near the battery pack so as to improve the structural rigidity of the vehicle body near the battery pack and overcome the imbalance of the vehicle due to the lack of the rigidity to a certain extent.

According to an optional aspect, the first reinforcing member may include a first reinforcing rod and a second reinforcing rod, and the cross connection portion may be formed by the first reinforcing rod and the second reinforcing rod crossing each other.

According to the above-described aspect, the cross connection portion is formed by crossing the first reinforcing rod and the second reinforcing rod to achieve a simple structure and it facilitates the assembly.

According to an optional aspect, a central axis of the first reinforcing rod, a central axis of the second reinforcing rod, and a central axis reinforcing portion may be on the same plane of a first reference plane.

According to the above-described aspect, the first reinforcing rod, the second reinforcing rod, and the reinforcing portion are arranged on the same plane such that it is possible to relatively further balance the force received by the vehicle body reinforcing structure to improve the stability of the vehicle body reinforcing structure. Also, the coplanar setting of the first reinforcing rod, the second reinforcing rod and the reinforcing portion can reduce the space occupied by the vehicle body reinforcing structure and facilitate the layout of other structures in the vehicle body.

According to an optional aspect, the vehicle body reinforcing structure may further include a connection bracket, wherein at least one of the first reinforcing member and the second reinforcing member is connected with the vehicle body via the connection bracket and the battery pack.

According to the above-described aspect, at least one of the first reinforcing member or the second reinforcing member is connected with the battery pack via the connection bracket and the connection bracket is connected with the vehicle body, that is, the connection points of the vehicle body reinforcing structure with the vehicle body are increased by the connection bracket so as to improve the stability of the vehicle body reinforcing structure.

According to an optional aspect, the connection bracket may include a first connection portion at a first end, and a second connection portion at a second end, the first connection portion may be connected with the battery pack, the second connection portion may be connected with the vehicle body, the first connection portion may be positioned at a first side of the first reference plane, and the second connection portion may be positioned at a second side of the first reference plane.

According to the above-described aspect, the portion of the battery pack for connecting to the first connection portion is referred to as a first connection point and the portion of the vehicle body for connecting to the second connection portion is referred to as a second connection point. The above-described aspect is suitable for the situation in which a lateral distance between the first connection point of the battery pack and the second connection point of the vehicle body is relatively large such that by providing the first connection portion and the second connection portion on two sides of the first reference plane, it is possible to simultaneously connect the vehicle body reinforcing structure to the first connection point of the battery pack and the second connection point of the vehicle body, reduce the inclination angle of the first reference plane with respect to the horizontal plane, and improve the structural stability of the vehicle body reinforcing structure.

According to an optional aspect, the connection bracket may include a covering portion that covers an outside wall of the first reinforcing member or the second reinforcing member connected to the connection bracket.

According to the above-described aspect, the contact area with the corresponding first reinforcing member and the second reinforcing member is increased by providing the covering portion so as to improve the connection stability between the connection bracket and the corresponding first reinforcing member or the second reinforcing member.

According to an optional aspect, the first reinforcing rod may include a first bending portion, the first reinforcing rod and the reinforcing portion may encircle to form a triangular structure, and/or the second reinforcing rod may include a second bending portion, and the second reinforcing rod and the reinforcing portion may encircle to form a triangular structure.

According to the above-described aspect, the first reinforcing rod and the reinforcing portion form the triangular structure, and/or the second reinforcing rod and the reinforcing portion form the triangular structure so as to improve the stability of the vehicle body reinforcing structure since the triangular structure has the characteristics of strong stability.

According to an optional aspect, an first end of the first reinforcing rod and a first end of the second reinforcing rod may be connected with each other to form a first fixing portion, the first reinforcing rod and the second reinforcing rod may form a triangular structure with the cross connection portion at the first fixing portion, and/or a second end of the first reinforcing rod and a second end of the second reinforcing rod may be connected with each other to form a second fixing portion, and the first reinforcing rod and the second reinforcing rod may form the triangular structure with the cross connection portion at the second fixing portion.

According to the above-described aspect, by using the structural arrangement characteristic of the first reinforcing rod and the second reinforcing rod, it is possible to form at least two triangular structure after connecting the first reinforcing rod and the second reinforcing rod so as to further improve the structural stability of the first reinforcing member by utilizing the characteristics of strong stability of the triangular structure.

According to an optional aspect, two of the connection brackets may be provided, a first connection bracket may be connected with the first bending portion of the first reinforcing rod and arranged to be inclined toward a direction of an intermediate portion of the reinforcing portion to be connected with the reinforcing portion, a second connection bracket may be connected with the second bending portion of the second reinforcing rod and arranged to be inclined toward a direction of the intermediate portion of the reinforcing portion to be connected with the reinforcing portion, and the first bending portion and the second portion may be positioned at different sides of the cross connection portion.

According to the above-described aspect, it is possible to increase two points for the vehicle body reinforcing structure to connect to the vehicle body by providing the two connection brackets. On the other hand, due to the two connection brackets, it is possible to connect the first reinforcing rod to the reinforcing portion and connect the second reinforcing rod to the reinforcing portion so as to improve the structural stability of the vehicle body reinforcing structure. The connection bracket is connected at the first bending portion of the first reinforcing rod and inclined toward the direction of the intermediate portion of the reinforcing portion such that part of the structure of the connection bracket and the first reinforcing rod and part of the structure of the reinforcing portion form the approximate triangular structure. The other connection bracket is connected at the second bending portion of the second reinforcing rod and inclined toward the direction of the intermediate portion of the reinforcing portion such that part of the structure of the connection bracket and the second reinforcing rod and part of the structure of the reinforcing portion form the approximate triangular structure. Thus, the stability of the vehicle body reinforcing structure is improved. In a projection of the vehicle body reinforcing structure on the first reference plane, the two connection brackets divides the area formed by the outer edge of the projection of the vehicle body reinforcing structure on the first reference plane into three parts having the same or similar area with each other such that the force with respect to the vehicle body reinforcing structure is further balanced and the structural stability is further improved.

According to an optional aspect, the second reinforcing rod may include a first strut and a second strut, and the first strut and the second strut may be connected to two sides of the first reinforcing rod so as to form the cross connection portion with the first reinforcing rod.

According to the above-described aspect, the first strut and the second strut of the second reinforcing rod are connected to the two sides of the first reinforcing rod to form the cross connection portion such that it is possible to avoid the first reinforcing rod and the second reinforcing rod from interfering with each other when the first reinforcing rod and the second reinforcing rod cross to connect with each other and avoid the thickness of the first reinforcing member from becoming relatively large, thus the first reinforcing member takes up less space.

According to another aspect of the present disclosure, a vehicle including a vehicle body; and a battery pack installed in the vehicle body, wherein the vehicle further includes the vehicle body reinforcing structure according to the above-described aspects is provided.

According to the above-described aspect, the vehicle body reinforcing structure is provided beside the battery pack of the vehicle body such that it is possible to enhance the body rigidity near the battery pack.

DESCRIPTION OF EMBODIMENTS

Figure 1:
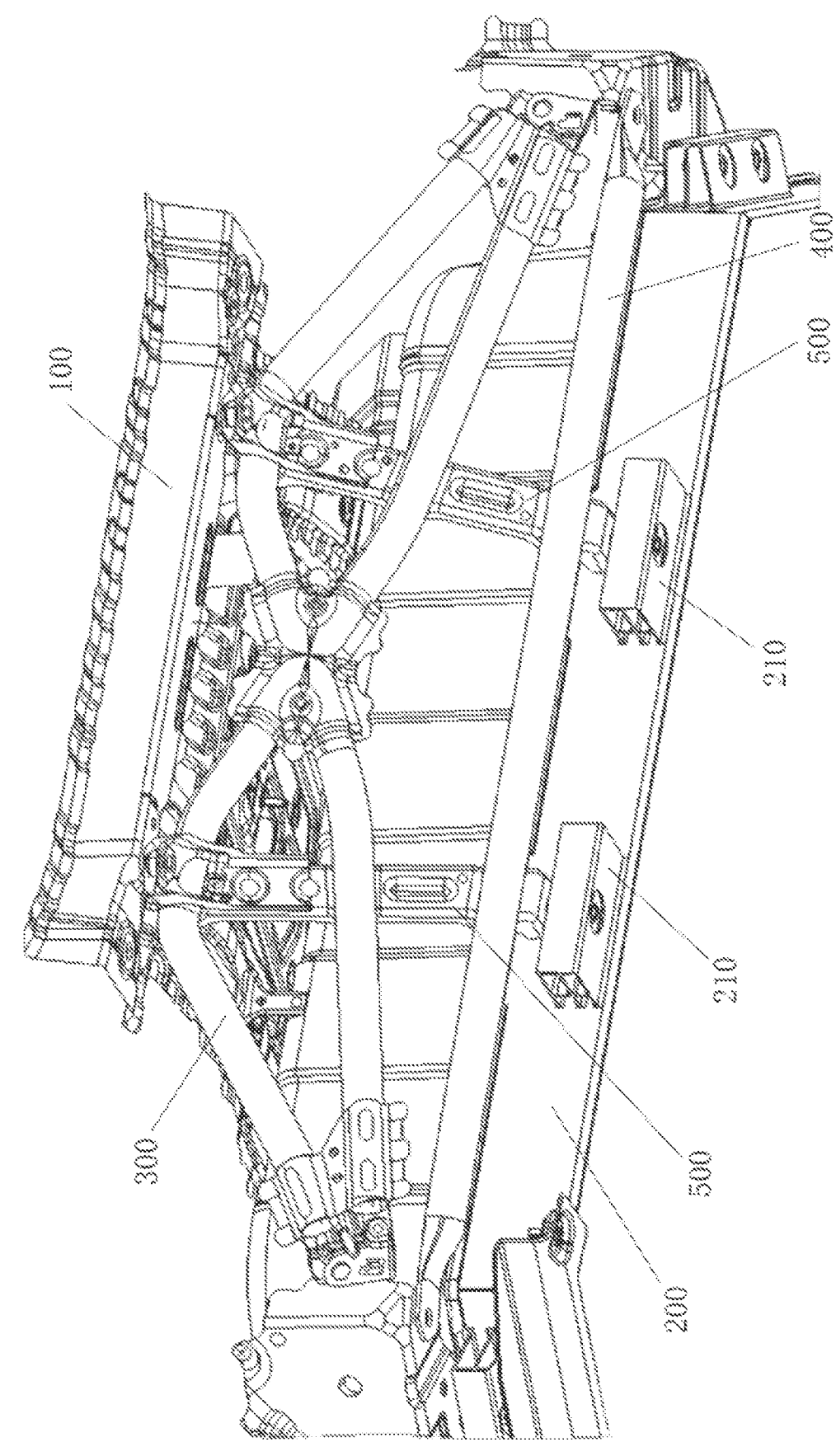
FIG. 1 is a schematic view showing a vehicle body reinforcing structure being mounted on a vehicle body according to an embodiment of the present disclosure.

In order to make the technical solutions according to the embodiments of the present disclosure to be clearly described, hereinafter, the drawings being necessary in the embodiments and examples of the present disclosure will be briefly described. Hereinafter, the configurations described in the drawings in the following embodiments are only specific examples of the present disclosure, and a person with ordinary skill in the art can achieve other drawings based on the enclosed drawings of the present disclosure.

In order to more clearly describe the technical solutions and effects according to the present disclosure, hereinafter, the present disclosure will be further described in details with the drawings and embodiments. It is noted that the specific embodiments described below are only used to explain the present disclosure rather than limiting the present disclosure.

In the following description, unless otherwise defined, when a member is "fixed to" or "arranged on" another member, the member may be directly on or indirectly on the other member. When the member is "connected" to another member, the member may be directly connected to or indirectly connected to the other member.

In the description of the present disclosure, it is noted that the orientation or positional relationship indicated by the terms "up", "down", "front", "rear", "left", "right", "vertical", "horizontal", "top", "bottom", "inside", "outside" and the like indicate the orientation or the positional relationship based on the orientation when the vehicle is positioned in the horizontal side. Such orientation or the positional relationship are used only for the convenience of describing the present disclosure and simplifying the description. Such terms cannot be interpreted to indicate or imply that the specified device or member has to be configured with the specified orientation or operated with the specified orientation, and such terms cannot be considered to be the limitation to the present disclosure.

The terms "first" and "second" are only used for making the description easy to understand, and they cannot be interpreted to indicate or imply the importance of the configurations or imply the amount of the technical features. Thus, the features being limited by the terms as "first" or "second" may indicate or imply one feature or more features. In the description of the present disclosure, unless otherwise defined, the term "a plurality of" means that an amount is equal to two or more than two. Furthermore, unless otherwise defined, the term "some" means that an amount is equal to one or more than one.

In the description of the present disclosure, unless otherwise defined, it is noted that the terms "install", "communicate", and "connect" should be broadly understood. For example, according to such terms, it is possible to perform a fixedly connection, or a detachably connection, or an integrally connection. Also, a mechanical connection may be performed while an electrical connection may be performed. Furthermore, a direct connection, an indirect connection via an intermediate media, or a connection connecting the inside of two elements may be performed. For a person with ordinary skill in the art, the specific meaning of the above-mentioned terms may be suitably understood according to the actual situation.

In the description of the present disclosure, the terms of referring to "an embodiment", "some embodiment", or "embodiments" mean that one embodiment or multiple embodiments of the present disclosure include the specified features, structure, or characteristic described according to the embodiments. Accordingly, unless specifically emphasized otherwise, the terms "in one embodiment", "in some embodiments", "in other embodiments", or the like that appear in various paragraphs in this specification does not necessarily all refer to the same embodiment, however, such terms mean "one or more embodiments but not all of the embodiments". Additionally, in one or more embodiments, the features, structure, and the characteristic may be combined in any appropriate manner.

The present disclosure will be described by referring to the enclosed drawings and embodiments shown below.

Figure 2:
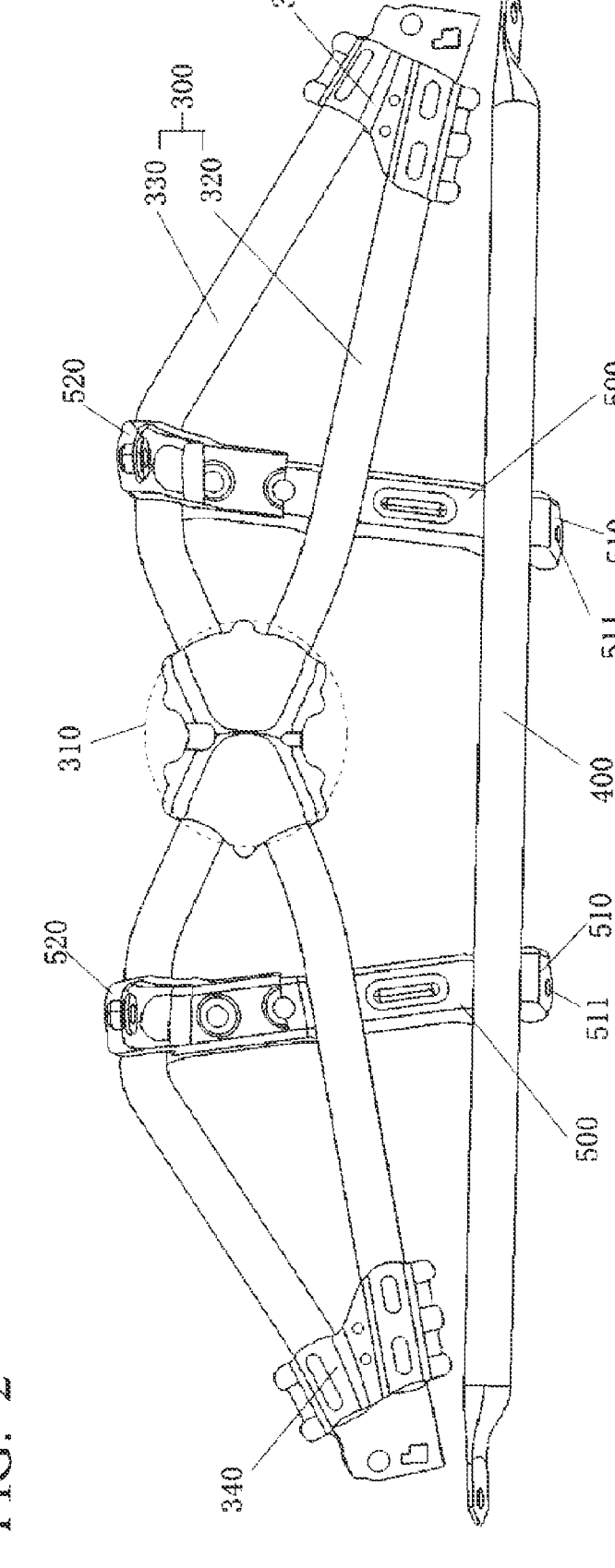
FIG. 2 is a schematic view showing a perspective structure of the vehicle body reinforcing structure according to the embodiment of the present disclosure.
Figure 3:
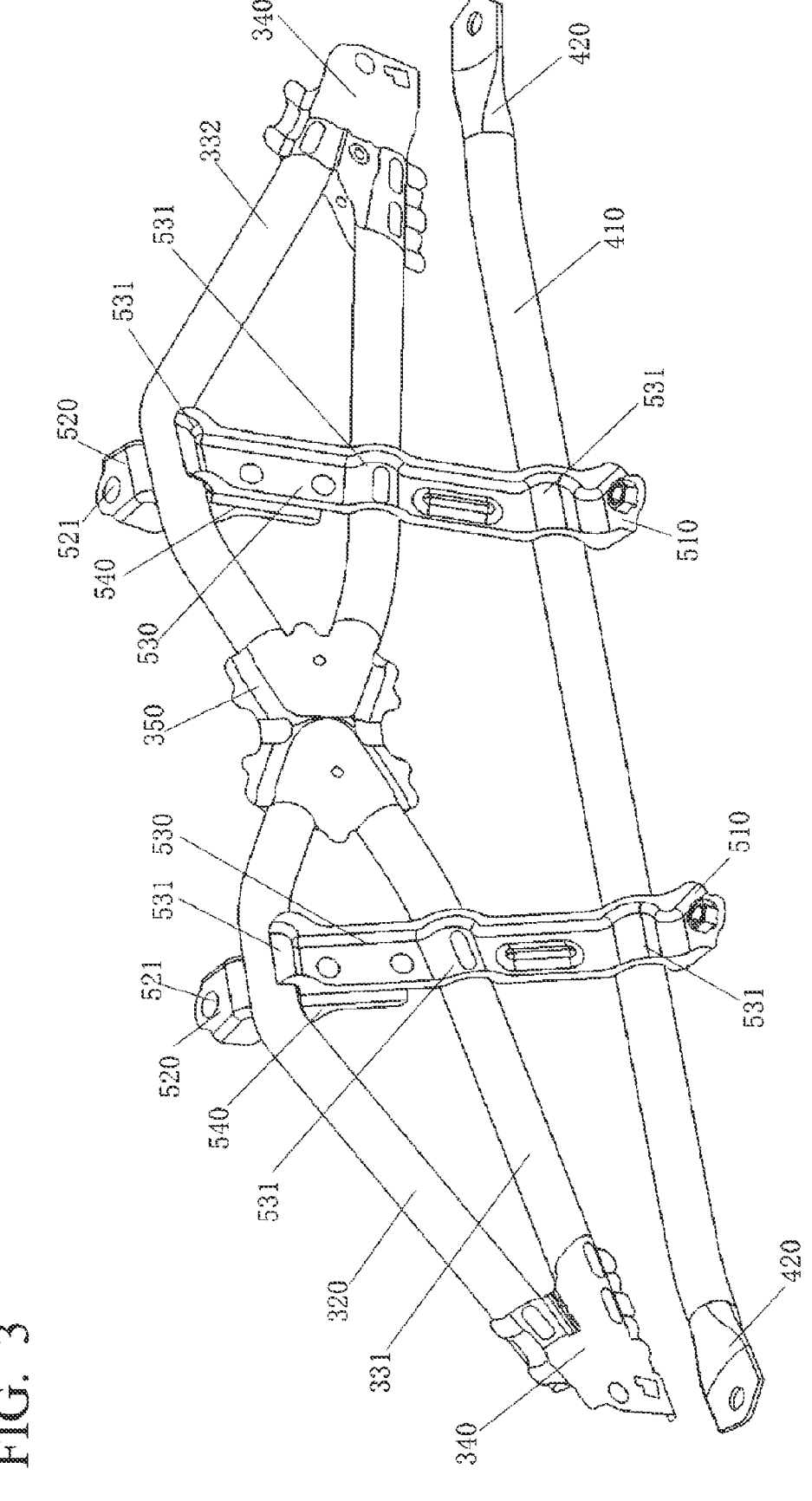
FIG. 3 is a schematic view showing another perspective structure of the vehicle body reinforcing structure according to the embodiment of the present disclosure.

As shown in FIG. 1 to FIG. 3, a vehicle body reinforcing structure that is installed in a vehicle according to the present disclosure is provided, wherein the vehicle includes a vehicle body 100 and a battery pack 200 and the battery pack is arranged inside the vehicle body 100. The vehicle body reinforcing structure includes a first reinforcing member 300 and a second reinforcing member 400, wherein the first reinforcing member 300 and the second reinforcing member 400 extend along a length direction of a side surface of the battery pack 200. Tow ends of the first reinforcing member 300 are connected to the vehicle body 100 respectively, and the first reinforcing member 300 at least includes a cross-connection portion 310. The second reinforcing member 400 at least includes a reinforcing portion 410 extending along the length direction of the side surface of the battery pack 200, and two ends of the second reinforcing member 400 are connected to the vehicle body 100 respectively.

The vehicle body reinforcing structure provided by the present embodiment is arranged in the vehicle including the battery pack 200 and arranged near the battery pack 200, wherein the vehicle body reinforcing structure may be installed at either side of the battery pack 200. The first reinforcing member 300 and the second reinforcing member 400 are positioned at the same side of the battery pack 200. The first reinforcing member 300 at least includes one cross-connection portion 310 and the second reinforcing member 300 at least includes one reinforcing portion 410 extending along the length direction of the side surface of the battery pack 200 so as to significantly improve the structural strength of the vehicle body reinforcing structure. The first reinforcing member 300 and the second reinforcing member 400 are provided at the side surface of the battery pack 200 respectively and connected to the vehicle body 100 to strengthen the vehicle body 100 near the battery pack 200 by the vehicle body reinforcing structure so as to improve the structural rigidity of the vehicle body 100 near the battery pack 200 and overcome the imbalance of the vehicle due to lack of the rigidity.

In an example, the vehicle body reinforcing structure is installed at the front side or the rear side of the battery pack 200, wherein the left side and right side of the first reinforcing member 300 are fixed to the left side and right side of the vehicle body 100 respectively, and the left side and right side of the second reinforcing member 400 are fixed to the left side and right side of the vehicle body 100 respectively. During the driving process of the vehicle, the shaking is usually the largest when starting and braking, and most of the shakings occurred at this time are shakings in the front-rear side. Thus, by installing the vehicle body reinforcing structure at the front side or the rear side of the battery pack 200, the side surface of the first reinforcing member 300 and the second reinforcing member 400 facing the battery pack 200 limit the position of the battery pack 200 to a certain extent so as to achieve a better fixing effect with respect to the battery pack 200 at the starting or braking of the vehicle and improve the stability of the battery pack 200.

In a specific example, the second reinforcing member 400 includes the reinforcing portion 410 arranged to extend along the left-right direction, and when the left end and the right end of the second reinforcing member 400 are connected to the left side and right side of the vehicle body 100 respectively, the central axis of the reinforcing portion 400 is parallel to the horizontal plane and extends along the left-right direction. When the number of reinforcing members 410 is multiple, the axes of the reinforcing members 410 are parallel to each other and arranged at intervals with each other.

In another example, the axis of the reinforcing member 410 intersects the horizontal plane and extends along the left-right direction.

In another applicable example, the left end of the reinforcing portion 410 and the left end of the first reinforcing member 300 may be connected together and then connected to the left side of the vehicle body 100, and the right end of the reinforcing portion 410 and the right end of the first reinforcing member 300 may be connected together and then connected to the right side of the vehicle body 100.

In another applicable example, the end portions of the reinforcing portion 410 are connected to the two sides of the vehicle body 100 rather than connecting to the end portions of the first reinforcing member 300 respectively.

When the number of the reinforcing portion is multiple, it is possible to connect the left ends of the plurality of reinforcing members 410 by an auxiliary connection structure and then connect the left ends thereof to the left side of the vehicle body 100 together, and it is possible to connect the right ends of the plurality of reinforcing members 410 by the auxiliary connection structure and then connect the right ends thereof to the right side of the vehicle body 100 together. Or the left end and the right end of each reinforcing member 410 are individually connected to the left side and the right side of the vehicle body 100 respectively.

The reinforcing portion 410 may be a plate-shaped structure, a rod-shaped structure, an I-beam structure, or the structure in other shapes. As an example shown in FIG. 3, the reinforcing portion 410 is a crossbar and the left end and right end thereof are connected to the left side and right side of the vehicle body 100.

When the reinforcing portion 410 is the crossbar, for facilitating connecting the end portions of the reinforcing portion 410 to the vehicle body 100, it is optionally provide first mounting bases 420 at the two ends of the reinforcing portion 410 respectively. One end of the first mounting base 420 is sheathed in and fixed to the end portion of the reinforcing portion 410, and the first mounting base 420 includes a mounting stand. The mounting stand is formed in the flat structure so as to facilitate coming into contact with the planar portion in the vehicle body 100, increasing the contact area with the vehicle body 100, and facilitate fixing and connecting the first mounting base 420 to the vehicle body 100. The surface shape of the mounting stand may match the shape of the surface area in the vehicle body 100 for connecting the reinforcing portion 410, for example, when the surface of the structure in the vehicle body 100 for connecting the reinforcing portion 410 is a curved surface, the surface of the mounting stand has a curved surface having the same radian with that of the curved surface of the vehicle body 100 so as to make the sticking area with the vehicle body 100 to become larger and make the connection stability to become stronger. It is possible to provide a through-hole on the first mounting base 420 for facilitating connecting the first mounting base 420 to the vehicle body 100 by screws.

Optionally, the first mounting base 420 and the reinforcing portion 410 may be an integrated structure.

In a specific example, the second reinforcing member 400 includes one reinforcing portion 410, and the reinforcing portion 410 is a crossbar that is a hollow bar. It is possible to reduce the weight of the crossbar and reduce the cost by forming the crossbar as the hollow bar.

In an example, the first reinforcing member 300 is an integral structure that is manufactured by the one-piece molding and has at least one cross-connection portion 310. In other hand, as shown in FIG. 1 to FIG. 3, in another example, the first reinforcing member 300 includes a plurality of rod-shaped structure, and the plurality of rod-shaped structure are cross-connected to form the cross-connection portion 310. For example, the first reinforcing member 300 includes a first reinforcing rod 320 and a second reinforcing rod 330, and the first reinforcing rod 320 and the second reinforcing rod 330 are cross-connected to form the cross-connection portion 310. The first reinforcing rod 320 and the second reinforcing rod 330 are crossed means that the axis of the first reinforcing rod 320 and the axis of the second reinforcing rod 330 intersects each other and the axis of the first reinforcing rod 320 and the axis of the second reinforcing rod 330 are not parallel to each other and are not coincided with each other. Compared with the first reinforcing member 300 manufactured by the one-piece molding, the singular rod-shaped structure is relatively simple such that during the manufacturing process, it is easy to manufacture the first reinforcing member 300 including the first reinforcing rod 320 and the second reinforcing rod 330 and reduce the production costs.

The number of the first reinforcing rods 320 may be single or multiple, and the number of the second reinforcing rods 330 may be single or multiple. For example, according to one arrangement, the number of the first reinforcing rod 320 is one, and the number of the second reinforcing rods 330 is multiple, wherein the plurality of second reinforcing rods 330 arranged at intervals with each other, and each of the plurality of second reinforcing rods 330 is cross-connected with the first reinforcing rod 320 such that the cross-connection portion 310 is formed at each position where the first reinforcing rod 320 is cross-connected with each second reinforcing rod 330. According to another arrangement, the number of the first reinforcing rod 320 is multiple, and the number of the second reinforcing rods 330 is single, wherein the plurality of first reinforcing rods 320 arranged at intervals with each other, and each of the plurality of first reinforcing rods 320 is cross-connected with the second reinforcing rod 330 such that the cross-connection portion 310 is formed at each position where the second reinforcing rod 330 is cross-connected with each first reinforcing rod 320. According to a further arrangement, the number of the first reinforcing rods 320 and the number of the second reinforcing rods 330 are multiple, and the plurality of first reinforcing rods 320 and the plurality of second reinforcing rods 330 are cross-connected to form a grid structure, wherein the cross-connection portion 310 is formed at each intersecting portion.

According to the three arrangement shown above, there are multiple cross-connection portions 310 formed in the first reinforcing member 300. In the arrangement shown below, the number of the cross-connection portion is single. As shown in FIG. 2, the first reinforcing member 300 includes one first reinforcing rod 320 and one second reinforcing rod 330, and one cross-connection portion 310 is formed by the single first reinforcing rod 320 and the single second reinforcing rod 330, thus this type of first reinforcing member 300 has a simple structure for the assembly.

Figure 4:
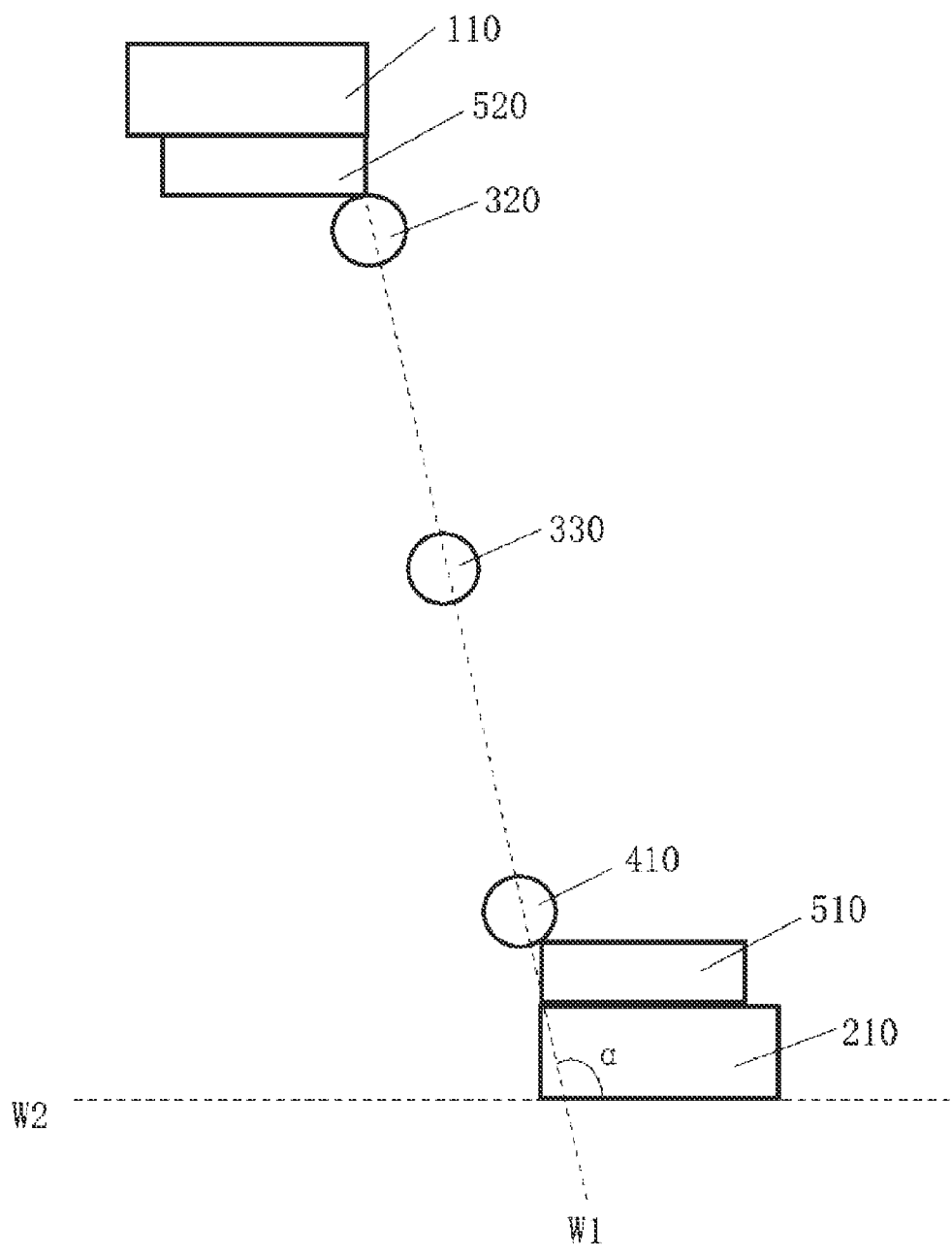
FIG. 4 is a schematic view showing the vehicle body reinforcing structure in which two ends of a connection bracket are positioned at the same side according to the embodiment of the present disclosure.

In an example, as shown in FIG. 4, the axis of the first reinforcing rod 320, the axis of the second reinforcing rod 330, and the axis of the reinforcing portion 410 are coplanar with the first reference plane W1. In other words, the axis of the first reinforcing rod 320, the axis of the second reinforcing rod 330, and the axis of the reinforcing portion 410 are on the same plane and the plane is the first reference plane W1. By arranging the first reinforcing rod 320, the second reinforcing rod 330, and the reinforcing portion 410 on the same plane, it is possible to further balance the force received by the vehicle body reinforcing structure to improve the stability of the vehicle body reinforcing structure. Also, the first reinforcing rod 320, the second reinforcing rod 330, and the reinforcing portion 410 are arranged on the same plane so as to reduce the space occupied by the vehicle body reinforcing structure and facilitate the arrangement of other structure in the vehicle body 100.

In an applicable example, the first reinforcing rod 320 and/or the second reinforcing rod 330 may be straight rods.

Or in another applicable example as shown in FIG. 1 to FIG. 3, both the first reinforcing rod 320 and the second reinforcing rod 330 have one bending portion respectively, the first reinforcing rod 320 and the reinforcing portion 410 encircle a space to form a triangle, and the second reinforcing rod 330 and the reinforcing portion 410 encircle a space to form another triangle. For facilitating the distinction, the bending portion of the first reinforcing rod 320 is referred to as a first bending portion, and the bending portion of the second reinforcing rod 330 is referred to as a second bending portion. More specifically, in the first reinforcing rod 320, the regions positioned at the two end portions of the first bending portion are arranged to be relatively inclined and when the first bending portion forms a right angle, the first reinforcing rod 320 forms an L-shaped structure. Similarly, in the second reinforcing rod 330, the regions positioned at the two end portions of the second bending portion are arranged to be relatively inclined and when the second bending portion forms a right angle, the second reinforcing rod 330 forms an L-shaped structure. Both the angles of the first bending portion and the second bending portion are between 0 degree and 180 degrees, and are not limited to 90 degrees. The reinforcing portion 410 is formed in the structure to extend laterally such that the reinforcing portion 410 forms the triangular structure with the first reinforcing rod 320 having the first bending portion and the second reinforcing rod 330 having the second bending portion. The triangular structure has a relatively high stability such that the vehicle body reinforcing structure with at least two triangular structure formed therein has a higher stability.

It is noted that when the first reinforcing rod 320 is an integral rod-shaped structure, the region that is bending in the first reinforcing rod 320 is the first bending portion. For example, in a case in which the first reinforcing rod 320 is manufactured by bending a straight rod, the portion that is bent is the first bending portion. When the first reinforcing rod 320 is a combination of multiple rod-shaped structure, one rod-shaped structure is bent to form the first bending portion and the first bending portion includes two end portions, and the axes of the two end portions intersect each other. The other rod-shaped structure in the first reinforcing rod 320 are the straight rods and each straight rod is coaxial with either end portion of the first bending portion. Similarly, when the second reinforcing rod 330 is an integral rod-shaped structure, the region that is bending in the second reinforcing rod 330 is the second bending portion. For example, in a case in which the second reinforcing rod 330 is manufactured by bending a straight rod, the portion that is bent is the second bending portion. When the second reinforcing rod 330 is a combination of multiple rod-shaped structure, one rod-shaped structure is bent to form the second bending portion and the second bending portion includes two end portions, and the axes of the two end portions intersect each other. The other rod-shaped structure in the second reinforcing rod 330 are the straight rods and each straight rod is coaxial with either end portion of the second bending portion.

According to an applicable design, the first reinforcing rod 320 and the second reinforcing rod 330 intersect each other to form the cross-connection portion 310, a first end of the first reinforcing rod 320 and a first end of the second reinforcing rod 330 are connected to form the first fixing portion, and the first reinforcing rod 320 and the second reinforcing rod 330 form the triangular structure between the first fixing portion and the cross-connection portion 310. Since the triangular structure has the strong stability, the first reinforcing rod 320 and the second reinforcing rod 330 that are connected to form the triangular structure have the high structural stability.

According to an applicable design, a second end of the first reinforcing rod 320 and a second end of the second reinforcing rod 330 are connected to form the second fixing portion, and the first reinforcing rod 320 and the second reinforcing rod 330 form the triangular structure between the second fixing portion and the cross-connection portion 310. Since the triangular structure has the strong stability, the first reinforcing rod 320 and the second reinforcing rod 330 that are connected to form the triangular structure have the high structural stability.

According to an applicable design, the first reinforcing rod 320 and the second reinforcing rod 330 intersect each other to form the cross-connection portion 310, the first end of the first reinforcing rod 320 and the first end of the second reinforcing rod 330 are connected to form the first fixing portion, and the second end of the first reinforcing rod 320 and the second end of the second reinforcing rod 330 are connected to form the second fixing portion such that the first reinforcing rod 320 and the second reinforcing rod 330 form the triangular structure between the first fixing portion and the cross-connection portion 310, and the first reinforcing rod 320 and the second reinforcing rod 330 form another triangular structure between the second fixing portion and the cross-connection portion 310. According to this arrangement, there are at least two triangular structure formed after connecting the first reinforcing rod 320 and the second reinforcing rod 330 so as to enhance the structural stability of the first reinforcing member 300 by utilizing the high stability characteristic of the triangular structure.

As an example, the left end of the first reinforcing rod 320 and the left end of the second reinforcing rod 330 are connected to form the first fixing portion, and the right end of the first reinforcing rod 320 and the right end of the second reinforcing rod 330 are connected to form the second fixing portion. On the left-right direction, the cross-connection portion 310 is positioned between the first fixing portion and the second fixing portion. The first bending portion is positioned between the first fixing portion and the cross-connection portion 310, and the second bending portion is positioned between the second fixing portion and the cross-connection portion 310. In other words, the structure of the first reinforcing rod 320 positioned at the left side of the cross-connection portion 310 and the structure of the second reinforcing rod 330 positioned at the left side of the cross-connection portion 310 are connected to form the triangular structure, and the structure of the first reinforcing rod 320 positioned at the right side of the cross-connection portion 310 and the structure of the second reinforcing rod 330 positioned at the right side of the cross-connection portion 310 are connected to form the other triangular structure.

In order to facilitate connecting the first reinforcing rod 320 and the second reinforcing rod 330, the vehicle body reinforcing structure further includes a second mounting base 340 and a third mounting base 350, wherein the second mounting base 340 is configured to connect the end portion of the first reinforcing rod 320 and the end portion of the second reinforcing rod 330 so as to form the first fixing portion and the second fixing portion, the third mounting base 350 is configured to connect the portions of the first reinforcing rod 320 and the second reinforcing rod 330 that intersect each other to form the cross-connection portion 310.

According to an example, as shown in FIG. 1 to FIG. 3, in the vehicle body reinforcing structure, the number of the second mounting bases 340 is two, and the two second mounting bases 340 are positioned at the two ends of the first reinforcing rod 320 respectively, wherein one of the two second mounting bases 340 is sheathed and fixed to the left end of the first reinforcing rod 320 and the left end of the second reinforcing rod 330 so as to connect the left end of the first reinforcing rod 320 and the left end of the second reinforcing rod 330. The other second mounting base 340 is sheathed and fixed to the right end of the first reinforcing rod 320 and the right end of the second reinforcing rod 330 so as to connect the right end of the first reinforcing rod 320 and the right end of the second reinforcing rod 330. The second mounting base 340 may include a first fixing member and a second fixing member, and two concave portions are provided in the first fixing member and the second fixing member respectively. During the assembly process, the end portion of the first reinforcing rod 320 is placed in one concave portion of the first fixing member, the end portion of the second reinforcing rod 330 is placed in the other concave portion of the first fixing member, and the second fixing member is buckled to the first fixing member so as to make the two concave portions of the second fixing member are buckled to the first reinforcing rod 320 and the second reinforcing rod 330 respectively. Then, the first fixing member and the second fixing member are connected and fixed so as to finish the assembly of connecting and fixing the end portion of the first reinforcing rod 320 and the end portion of the second reinforcing rod 330 by the second mounting base 340. The first reinforcing member 300 may connected to the vehicle body 100 by the two mounting bases 340.

According to an example, the third mounting base 350 includes a third fixing member and a fourth fixing member, and two concave portions are provided in the third fixing member and the fourth fixing member respectively. During the assembly process, the intersecting portion of the first reinforcing rod 320 and the second reinforcing rod 330 is placed in the concave portion of the third fixing portion and the fourth fixing member is buckled on the third fixing member so as to make the concave portion of the fourth fixing member is buckled on the intersecting portion of the first reinforcing rod 320 and the second reinforcing rod 330. Subsequently, the third fixing member and the fourth fixing member are connected to each other so as to finish the assembly of cross-connecting the first reinforcing rod 320 and the second reinforcing rod 330 to form the cross-connection portion 310.

According to an example, the vehicle body reinforcing structure may further include a connection bracket being connectable to the vehicle body 100, and at least one of the first reinforcing member 300 and the second reinforcing member 400 is connected to the vehicle body 100 via the connection bracket 500. In other words, it is possible that only the first reinforcing member 300 is connected to the connection bracket 500, or only the second reinforcing member 400 is connected to the connection bracket 500, or the first reinforcing member 300 and the second reinforcing member 400 may be connected to the connection bracket 500 respectively. The first reinforcing member 300 and the second reinforcing member 400 are connected to the vehicle body 100 respectively and the connection bracket 500 is connected to the vehicle body 100 so as to increase the connection points between the vehicle body reinforcing structure and the vehicle body 100 by providing the connection bracket 500 and thus improve the connection stability between the vehicle body reinforcing structure and the vehicle body 100.

According to an example, the vehicle body reinforcing structure is connected to the battery pack 200. More specifically, at least one of the first reinforcing member 300 and the second reinforcing member 400 may be connected to the battery pack 200, or the connection bracket 500 may be connected to the battery pack 200. By connecting the vehicle body reinforcing structure to the battery pack 200, the battery pack 200 is connected to the vehicle body 100 via the vehicle body reinforcing structure so as to avoid the shaking of the battery pack 200 during the travelling of the vehicle and improve the stability of the battery pack 200.

According to an applicable design, the connection bracket 500 in the vehicle body reinforcing structure is connected to the battery pack 200. As shown in FIG. 1 to FIG. 3, one end of the connection bracket 500 includes a first connection portion 510, and the other end of the connection bracket 500 includes a second connection portion 520, the first connection portion 510 is connected to the battery pack 200 and the second connection portion 520 is connected to the vehicle body 100. More specifically, the first connection portion 510 is connected to the side surface of the battery pack 200 and the second connection portion 520 is connected to the bottom portion of the crossbeam of the vehicle body 100.

As shown in FIG. 1 and FIG. 4, the region of the battery pack 200 for connecting the first connection portion 510 is referred to as the second connection point 210, and the region of the vehicle body 100 for connecting the second connection portion 520 is referred to as the first connection point 110.

As shown in FIG. 2, the first connection portion 510 and the second connection point 210 of the battery pack 200 may be connected by the screws. The first connection portion 510 is provided with the first installation hole 511 for passing through the screws so as to connect the first connection portion 510 and the second connection point 210 of the battery pack 200 by the screws. As shown in FIG. 3, the second connection portion 520 and the first connection point 110 of the vehicle body 100 may be connected by the screws. The second connection portion 520 is provided with the second installation hole 521 for passing through the screws so as to connect the second connection portion 520 and the first connection point 110 of the vehicle body 100.

According to an example, the first connection portion 510 and the second connection portion 520 may be provided at the same side or the different sides of the vehicle body reinforcing structure. For example, when the vehicle body reinforcing structure is provided at the front side or the rear side of the battery pack 200, the first reinforcing member 300 and the second reinforcing member 400 extend along the left-right direction such that both the first connection portion 510 and the second connection portion 520 may be provided in the front-side region or the rear-side region of the vehicle body reinforcing structure, or either of the first connection portion 510 or the second connection portion 520 may be provided in the front-side region of the vehicle body reinforcing structure, and the other may be provided in the rear-side region of the vehicle body reinforcing structure.

Figure 5:
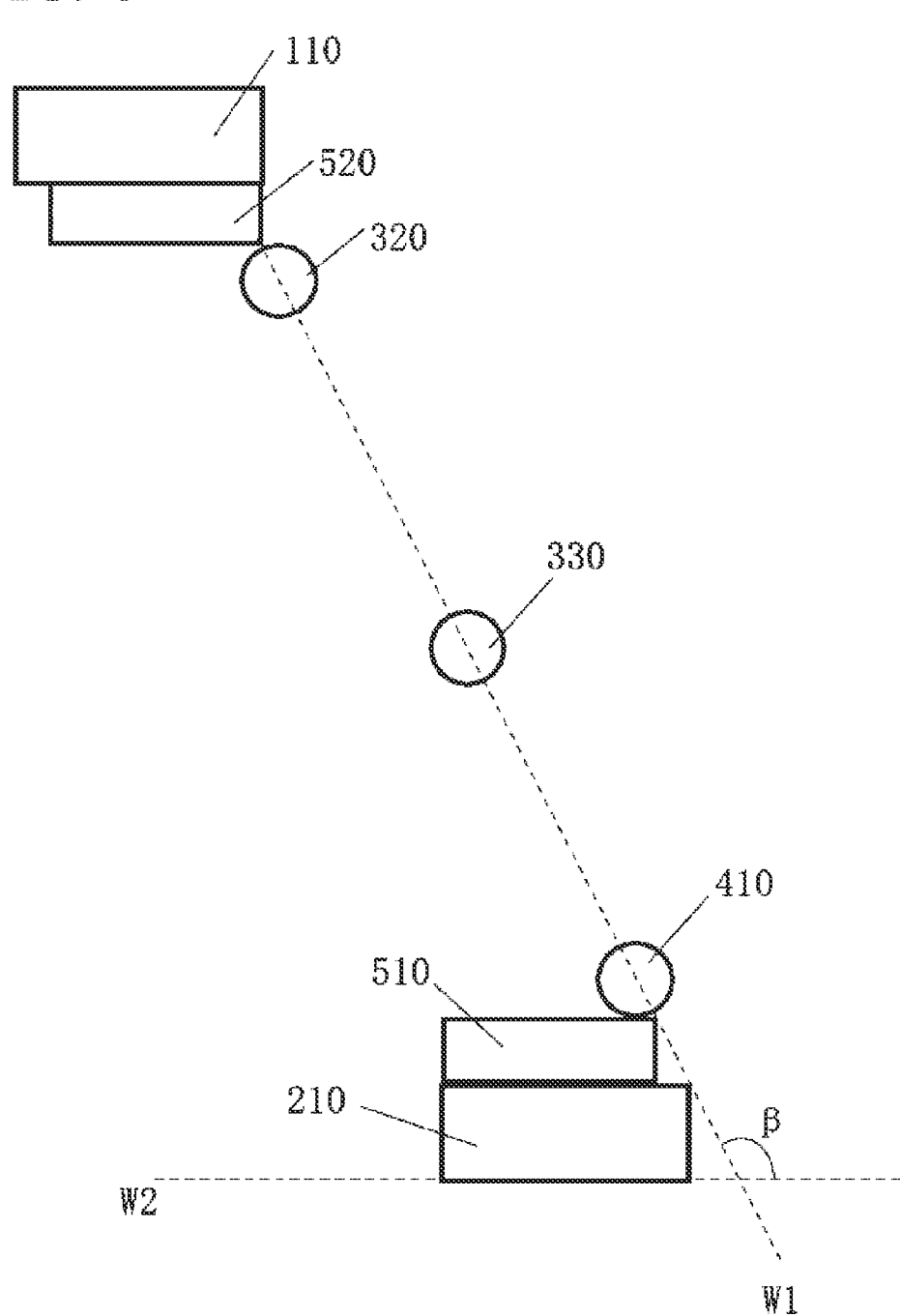
FIG. 5 is a schematic view showing the vehicle body reinforcing structure in which the two ends of the connection bracket are positioned at different sides according to the embodiment of the present disclosure.
Figure 6:
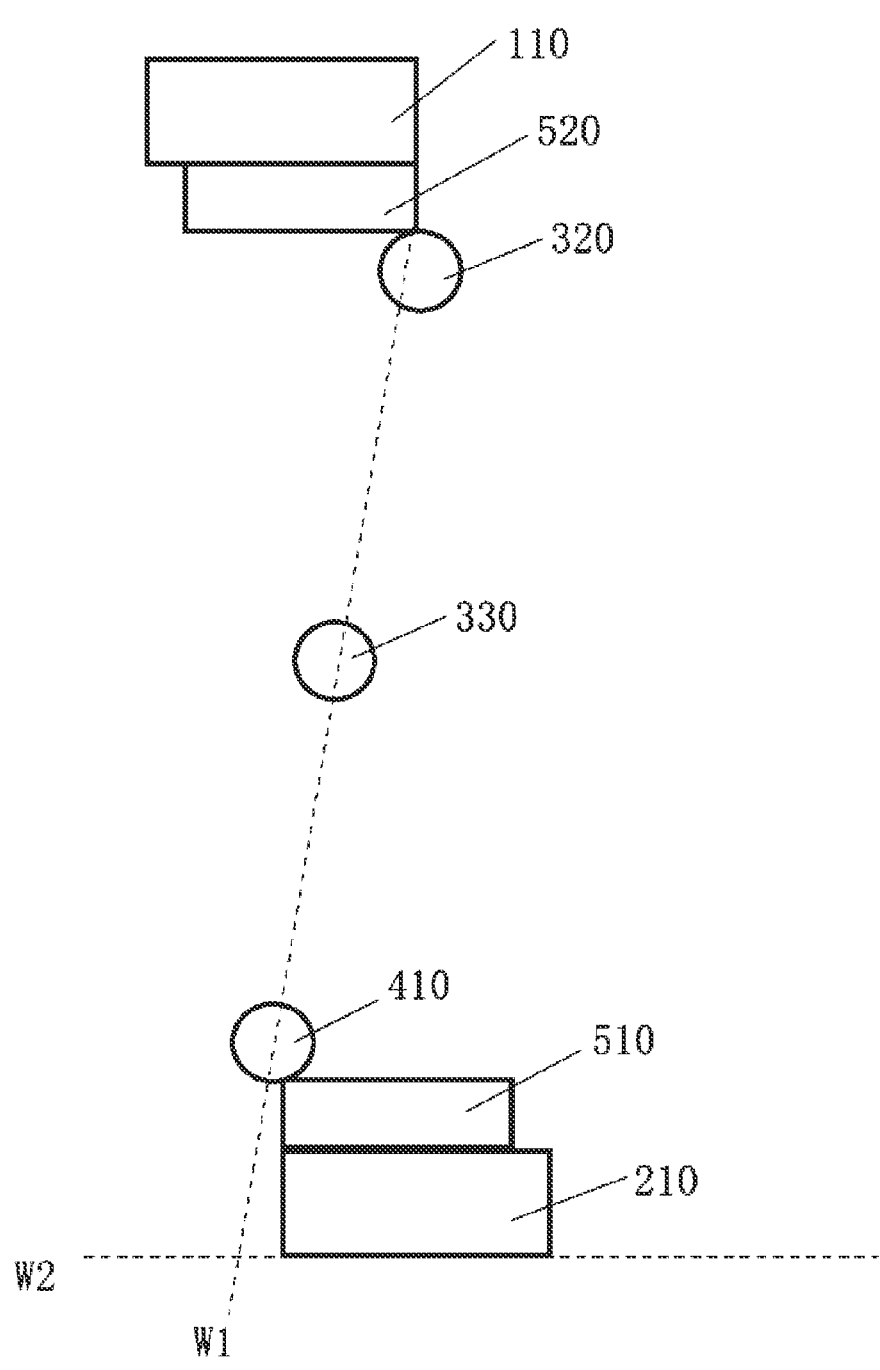
FIG. 6 is a schematic view showing a vehicle body reinforcing structure in which two ends of a connection bracket are positioned at the same side according to another embodiment of the present disclosure.
Figure 7:
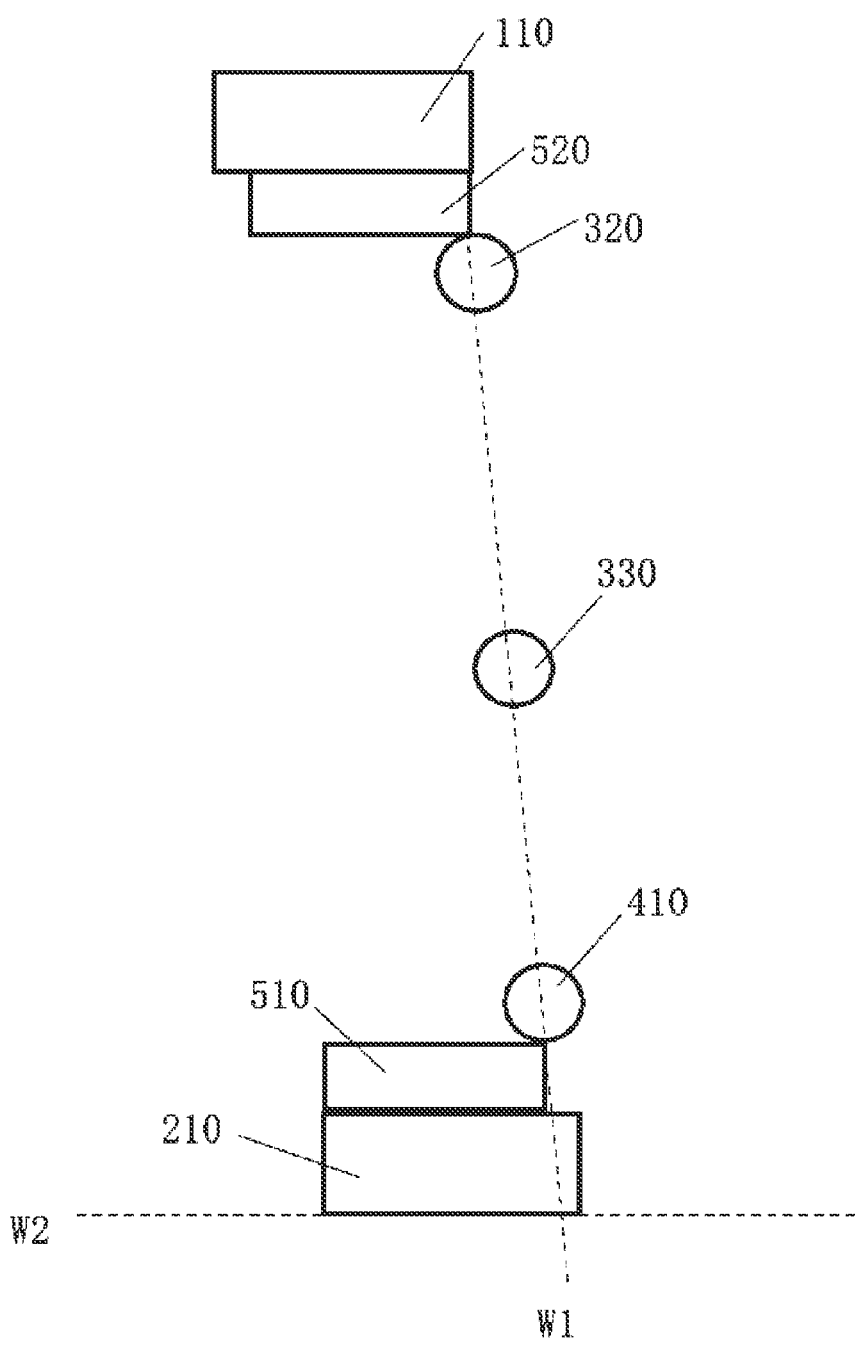
FIG. 7 is a schematic view showing the vehicle body reinforcing structure in which the two ends of the connection bracket are positioned at different sides according to another embodiment of the present disclosure.

When the axis of the first reinforcing rod 320 and the axis of the second reinforcing rod 330 in the first reinforcing member 300, and the axis of the reinforcing portion 410 of the second reinforcing member 400 are on the same first reference plane W1, as shown in FIG. 5 and FIG. 7, according to an applicable example, both the first connection portion 510 and the second connection portion 520 are positioned on the same side of the first reference plane W1. On the other hand, as shown in FIG. 4 and FIG. 6, according to another applicable example, the first connection portion 510 is positioned on the first side of the first reference plane W1, and the second connection portion 520 is on the second side of the first reference plane W1.

As shown in FIG. 4 and FIG. 5, when the lateral distance between the projections of the first connection point 110 of the battery pack 200 and the second connection point 210 of the vehicle body 100 on the horizontal plane is equal to or larger than a predetermined distance, if the first connection portion 510 and the second connection portion 520 are arranged on the different sides of the first reference plane W1, the angle formed between the first reference plane W1 and the horizontal plane W2 is referred to as α (as shown in FIG. 4). If the first connection portion 510 and the second connection portion 520 are arranged on the same side of the first reference plane W1, the angle formed between the first reference plane W1 and the horizontal plane W2 is referred to as β (as shown in FIG. 5) and the angle α and the angle β satisfies the formula as 90 degrees<α<β. That is, the angle β is larger than the angle α, and the angle α is larger than 90 degrees. Since the angle between the first reference plane W1 and the horizontal plane W2 is closer to 90 degrees, the stability thereof is relatively higher, thus in this case, the first connection portion 510 and the second connection portion

520 are arranged on the different sides of the first reference plane W1. Here, the predetermined distance may be determined according to the actual requirements and it is not particularly limited in this example.

That is, the configuration of arranging the first connection portion 510 and the second connection portion 520 at the different sides of the first reference plane W1 is suitable for the case in which the lateral distance between the first connection point 110 and the second connection point 210 is relatively far from each other. By arranging the first connection portion 510 and the second connection portion 520 at the different sides of the first reference plane W1, it is possible to connect the vehicle body reinforcing structure to each of the first connection point 110 and the second connection point 210 while decreasing the inclination angle of the first reference plane W1 with respect to the horizontal plane W2 to make the inclination angle to be further closer to 90 degrees so as to improve the structural stability of the vehicle body reinforcing structure.

As shown in FIG. 6 and FIG. 7, based on the similar principle, when the lateral distance between the projections of the first connection point 110 of the battery pack 200 and the second connection point 210 of the vehicle body 100 on the horizontal plane is smaller than the predetermined distance (for example, there is a partial overlapping region between the projections of the first connection point 110 of the battery pack 200 and the second connection point 210 of the vehicle body 100, or the projections of the first connection point 110 of the battery pack 200 and the second connection point 210 of the vehicle body 100 completely overlap each other), compared with the arrangement of arranging the first connection portion 510 and the second connection portion 520 on both sides of the first reference plane W1 as shown in FIG. 6, the arrangement of arranging the first connection portion 510 and the second connection portion 520 on the same side of the first reference plane W1 as shown in FIG. 7 is more suitable to improve the structural stability of the vehicle body reinforcing structure and facilitate the arrangement and installation of the structure.

According to an example, as shown in FIG. 3, the connection bracket 500 includes a groove portion 531. A concave groove portion is formed in the connection bracket 500 to form the groove portion 531. At the time of connecting the connection bracket 500 to the first reinforcing member 300 or the second reinforcing member 400, the first reinforcing member 300 or the second reinforcing member 400 connected with the connection bracket 500 extends into the groove so as to increase the contact area between the connection bracket 500 and the first reinforcing member 300 or the second reinforcing member 400 connected with the connection bracket 500 and improve the connection stability between the connection bracket 500 and the corresponding first reinforcing member 300 or the second reinforcing member 400.

According to another example, the connection bracket 500 includes a covering portion, wherein the covering portion covers the outer side wall of the first reinforcing member 300 and the second reinforcing member 400 connected to the connection bracket 500. In an applicable case, the covering portion includes an arc-shaped extension portion, wherein the arc-shaped extension portion forms a covering cavity for covering the first reinforcing member 300 or the second reinforcing member 400 connected to the connection bracket 500. As shown in FIG. 3, in another applicable case, the connection bracket 500 includes a main bracket 530 and an auxiliary bracket 540, wherein the main bracket is provided with the groove portion 531, and the auxiliary bracket 540 is provided with a groove. After the main bracket 530 and the auxiliary bracket 540 are connected with each other, the groove of the auxiliary bracket 540 is relatively communicated with the groove of one groove portion 531 of the main bracket 530 to form the covering cavity for covering the outer wall of the first reinforcing member 300 or the second reinforcing member 400 connected to the connection bracket 500 so as to further increase the contact area of the first reinforcing member 300 or the second reinforcing member 400 connected thereto.

In FIG. 1 to FIG. 3, one connection bracket 500 is respectively connected to the first reinforcing member 300 and the second reinforcing member 400, and there are three connections. The groove portions 531 respectively corresponding to the three connections are provided in the main bracket 530, and the auxiliary bracket 540 is connected thereto in one of the three groove portions 531 to form one covering portion. It is noted that the number of the auxiliary brackets 540 may be two or three so as to form two or three covering portions in the connection bracket 500.

More specifically, the main bracket 530 and the auxiliary bracket 540 are positioned at two sides of the first reference plane W1.

According to an applicable design, the number of the connection brackets is two, and when the first reinforcing member 300 includes the first reinforcing rod 320 and the second reinforcing rod 30, one of the two connection brackets 500 is respectively connected to the first reinforcing rod 320 and the reinforcing portion 410, and the other connection bracket 500 is respectively connected to the second reinforcing rod 330 and the reinforcing portion 410. According to the above-described configuration, on the one hand, two connection points for connecting to the vehicle body 100 are increased in the vehicle body reinforcing structure by providing two connection brackets 500, and on the other hand, the first reinforcing rod 320 and the reinforcing portion 410 are connected with each other while the second reinforcing rod 330 and the reinforcing portion 410 are connected with each other via the two connection brackets 500 so as to improve the structural stability of the vehicle body reinforcing structure.

According to an applicable design, one connection bracket 500 is connected with the bending portion (first bending portion) of the first reinforcing rod 320, and the connection bracket 500 is arranged to be inclined toward the direction of the intermediate portion of the reinforcing portion 410 and connected to the reinforcing portion 410, and another connection bracket 500 is connected with the bending portion (second bending portion) of the second reinforcing rod 330, and the other connection bracket 500 is arranged to be inclined toward the direction of the intermediate portion of the reinforcing portion 410 and connected to the reinforcing portion 410. The first bending portion and the second bending portion are at different sides of the cross-connection portion 310. As an example, when both the first reinforcing member 300 and the second reinforcing member 400 extend along the left-right direction, the cross-connection portion 310 is positioned in the central region of the first reinforcing member 300, either of the first bending portion or the second bending portion is positioned in the left-side region of the cross-connection portion 310, and the other of the first bending portion or the second bending portion is positioned in the right-side region of the cross-connection portion 310. If the first bending portion is positioned at the left side and the second bending portion is positioned at the right side, the top end of the connection bracket 500 at the left side is connected to the first bending portion, and the bottom end thereof is inclined from the left side toward the right side and extends toward the lower side to be connected to the reinforcing portion 410. The top end of the connection bracket 500 at the right side is connected to the second bending portion, and the bottom end thereof is inclined from the right side toward the left side and extends toward the lower side to be connected to the reinforcing portion 410.

As an example, as shown in FIG. 2, the cross-connection portion 310 formed by the first reinforcing rod 320 and the second reinforcing rod 330 cross-connecting with each other is positioned between the first bending portion and the second bending portion, and the distance between the projections of the cross-connection portion 310 and the first bending portion on the horizontal plane is equal to or close to the distance between the projections of the of the cross-connection portion 310 and the second bending portion on the horizontal plane, thus the intermediate portion of the first reinforcing rod 320 and the intermediate portion of the second reinforcing rod 330 cross-connects to each other to form the cross-connection portion 310.

The connection bracket 500 is connected to the bending portion of the first reinforcing rod 320 and inclined toward the direction of the intermediate portion of the reinforcing portion 410 such that the connection bracket 500 forms the approximately triangular structure with part of the structure of the first reinforcing rod 320 and part of the structure of the reinforcing portion 410. The other connection bracket 500 is connected to the bending portion of the second reinforcing rod 330 and inclined toward the direction of the intermediate portion of the reinforcing portion 410 such that the connection bracket 500 forms the approximately triangular structure with part of the structure of the second reinforcing rod 330 and part of the structure of the reinforcing portion 410. Thus, it is possible to improve the stability of the vehicle body reinforcing structure. At the same time, in the projections of the vehicle body reinforcing structure on the first reference plane W1, the two connection brackets divides the region being encircled by the outer edge of the projections of the vehicle body reinforcing structure on the first reference plane W1 into three portions whose areas are close to or equal to each other so as to further balance the force received by the vehicle body reinforcing structure and improve the structural stability.

In a specific example, the bending portion includes two bending positions and a platform portion is formed between the two bending positions, wherein the arrangement of the platform portion facilitates the installation and the fixation of the connection bracket 500. For example, taking the process of manufacturing the bending portion by a straight rod as an example, wherein two ends of the straight rod is referred to as a first end and a second end, in the case in which a first bending position is formed by performing a bending between the first end and the second end, and a second bending position is formed by performing another bending between the first bending position and the second end, the segment of the rod between the first bending position and the second bending position forms the platform portion.

The first bending portion of the first reinforcing rod 320 includes the above-described platform portion, and/or the second bending portion of the second reinforcing rod 330 includes the above-described platform portion. For example, the vehicle body reinforcing structure includes two connection brackets 500, and both the first bending portion of the first reinforcing rod 320 and the second bending portion of the second reinforcing rod 330 include the platform portion respectively. The second connection portion 520 of one connection bracket 500 is communicated with the platform portion of the first bending portion, and the second connection portion 520 of the other connection bracket 500 is communicated with the platform portion of the second bending portion.

According to an applicable design, the second reinforcing rod 330 includes a first strut 331 and a second strut 332, wherein the second strut 332 includes the bending portion, and the first strut 331 and the second strut 332 are respectively connected to two sides of the first reinforcing rod 320 to form the cross-connection portion 310 with the first reinforcing rod 320. That is, the second reinforcing rod 330 includes the combination rod formed of the first strut 331 and the second strut 332. The combination rod and the first reinforcing rod 320 are connected with each other to form the cross-connection portion 310. The second reinforcing rod 330 may include one combination rod or a plurality of combination rods so as to form one cross-connection portion 310 or a plurality of cross-connection portions 310 by connecting with the first reinforcing rod 320. More specifically, the axis of the first strut 331 is coincided with the extension of the axis of the second strut 332, and the axis of the first strut, the axis of the second strut 332, and the axis of the first reinforcing rod 320 are on the same plane as the first reference plane W1. By respectively connecting the individually provided first strut 331 and the second strut 332 of the second reinforcing rod 330 to the two sides of the first reinforcing rod 320, it is possible to ensure the formation of the cross-connection portion 310 with the first reinforcing portion 320 while avoiding the thickness of the first reinforcing member 300 from being relatively large due to the interference between the first reinforcing rod 320 and the second reinforcing rod 330 occurred when the first reinforcing rod 320 and the second reinforcing rod 330 cross-connects with each other so as to make the first reinforcing member 300 to occupy less space.

In an example, both the first reinforcing rod 320 and the second reinforcing rod 330 are hollow rods so as to decrease the gross weight of the first reinforcing member 300.

According to an example, the vehicle body reinforcing structure is installed at the bottom side of the vehicle body 100 and close to the rear portion of the battery pack 200 such that the vehicle body reinforcing structure is connected to the battery pack 200 from the rear portion of the battery pack 200 to reinforce the rear portion of the vehicle body 100 and improve the stability of the battery pack 200. As shown in FIG. 1 to FIG. 4, the vehicle body reinforcing structure includes the first reinforcing member 300, the second reinforcing member 400, and the connection bracket 500. The second reinforcing member 400 includes the reinforcing portion 400, wherein the reinforcing portion 400 is the crossbar, and the left end and the right end of the crossbar are connected to the left side and the right side of the vehicle body 100 via the first mounting base 420 respectively. The first reinforcing member 300 includes the first reinforcing rod 320 and the second reinforcing rod 330, wherein the second reinforcing rod 330 includes the first strut 331 and the second strut 332, and the first strut 331 and the second strut 332 are respectively connected to the two sides of the intermediate portion of the first reinforcing rod 320 via the third mounting base 350 to form the cross-connection portion 310. The left side of the first strut 331 and the left end of the first reinforcing rod 320 are connected via one second mounting base 340, and the right end of the second strut 332 and the right end of the first reinforcing rod 320 are connected via another second mounting base 340. The two of second mounting bases 340 are connected to the left side and the right side of the vehicle body 100 respectively. All of the first strut 331, the second strut 332, the first reinforcing rod 320, and the crossbar are hollow rods, and the axis of the first strut 331, the axis of the second strut 332, the axis of the first reinforcing rod 320, and the axis of the crossbar are on the same plane, that is, the first reference plane W1. In the projection of the vehicle body reinforcing structure on the first reference plane W1, the crossbar is positioned at the lower side of the first strut 331, the second strut 332, and the first reinforcing rod 320. The second strut 332 includes the second bending portion in the right-side region of the cross-connection portion 310, and the first reinforcing rod 320 includes the first bending portion in the left-side region of the cross-connection portion 310. Accordingly, the projections of the first reinforcing rod 320 and the reinforcing portion 410 on the first reference plane W1 are in the triangular shape, and the projections of the second reinforcing rod 330 and the reinforcing portion 410 on the first reference plane W1 are in the triangular shape. The first strut 331 and the structure of the first reinforcing rod 320 that is positioned at the left side of the cross-connection portion 310 form the triangular structure, and the second strut 332 and the structure of the first reinforcing rod 320 that is positioned at the right side of the cross-connection portion 320 form the triangular structure. The number of the connection brackets 500 is two, wherein one of the two connection brackets 500 is connected to the first bending portion, the first strut 331 and the crossbar, and the other connection bracket 500 is connected to the second bending portion, the partial structure of the first reinforcing rod 320 that is positioned at the right side of the cross-connection portion 310, and the crossbar. The two connection brackets 500 are inclined toward the direction of the intermediate portion of the crossbar from the upper side to the lower side, that is, the connection bracket 500 positioned at the left side is inclined toward the lower right side, and the connection bracket 500 positioned at the right side is inclined toward the lower left side. Both the connection brackets include the main bracket 530 and the auxiliary bracket 540 respectively, the groove portions 531 corresponding to the three connection positions are provided in the main bracket 530 positioned at the left side, and the auxiliary bracket 540 is connected to the top portion of the main bracket 530 so as to communicate with the groove portion 531 provided at the uppermost side of the main bracket 530 to form the covering portion. The covering portion covers the outer side of the first bending portion, and the covering portion at least covers about ¾ of the region in the outside of the circumference of the first bending portion. The groove portions 531 corresponding to the three connection positions are provided in the main bracket 530 positioned at the right side, and the auxiliary bracket 540 is connected to the top portion of the main bracket 530 so as to communicate with the groove portion 531 provided at the uppermost side of the main bracket 530 to form the covering portion. The covering portion covers the outer side of the second bending portion, and the covering portion at least covers about ¾ of the region in the outside of the circumference of the second bending portion. The top portion of the connection bracket 500 includes the first connection portion 510 for connecting to the battery pack 200, and the bottom portion of the connection bracket 500 includes the second connection portion 520 for connecting to the bottom side of the vehicle body 100. The first connection portion is positioned at the side facing the battery pack 200 in the top portion of the first reinforcing member 300, and the second connection portion 520 is positioned at the side separating from the battery pack 200 in the bottom portion of the second reinforcing member 400, that is, the first connection portion 510 and the second connection portion 520 are positioned at two sides of the first reference plane W1.

According to the above-described aspect, the first reinforcing member includes at least one cross connection portion and the second reinforcing member includes at least one reinforcing portion arranged to extend along a longitudinal direction of a side surface of the battery pack such that in a case in which the extending directions of the first reinforcing member and the second reinforcing member are the same with each other (that is, extending along the length direction of the side surface of the battery pack), the structural strength of the vehicle body is improved due to the general effect of the cross connection portion and the reinforcing portion. The first reinforcing member and the second reinforcing member are provided on the side surface of the battery pack respectively and connected with the vehicle body to reinforce the vehicle body near the battery pack so as to improve the structural rigidity of the vehicle body near the battery pack and overcome the imbalance of the vehicle due to the lack of the rigidity to a certain extent.

According to the above-described aspect, the cross connection portion is formed by crossing the first reinforcing rod and the second reinforcing rod to achieve a simple structure and it facilitates the assembly.

According to the above-described aspect, the first reinforcing rod, the second reinforcing rod, and the reinforcing portion are arranged on the same plane such that it is possible to relatively further balance the force received by the vehicle body reinforcing structure to improve the stability of the vehicle body reinforcing structure. Also, the coplanar setting of the first reinforcing rod, the second reinforcing rod and the reinforcing portion can reduce the space occupied by the vehicle body reinforcing structure and facilitate the layout of other structures in the vehicle body.

According to the above-described aspect, at least one of the first reinforcing member or the second reinforcing member is connected with the battery pack via the connection bracket and the connection bracket is connected with the vehicle body, that is, the connection points of the vehicle body reinforcing structure with the vehicle body are increased by the connection bracket so as to improve the stability of the vehicle body reinforcing structure.

According to the above-described aspect, the portion of the battery pack for connecting to the first connection portion is referred to as a first connection point and the portion of the vehicle body for connecting to the second connection portion is referred to as a second connection point. The above-described aspect is suitable for the situation in which a lateral distance between the first connection point of the battery pack and the second connection point of the vehicle body is relatively large such that by providing the first connection portion and the second connection portion on two sides of the first reference plane, it is possible to simultaneously connect the vehicle body reinforcing structure to the first connection point of the battery pack and the second connection point of the vehicle body, reduce the inclination angle of the first reference plane with respect to the horizontal plane, and improve the structural stability of the vehicle body reinforcing structure.

According to the above-described aspect, the contact area with the corresponding first reinforcing member and the second reinforcing member is increased by providing the covering portion so as to improve the connection stability between the connection bracket and the corresponding first reinforcing member or the second reinforcing member.

According to the above-described aspect, the first reinforcing rod and the reinforcing portion form the triangular structure, and/or the second reinforcing rod and the reinforcing portion form the triangular structure so as to improve the stability of the vehicle body reinforcing structure since the triangular structure has the characteristics of strong stability.

According to the above-described aspect, by using the structural arrangement characteristic of the first reinforcing rod and the second reinforcing rod, it is possible to form at least two triangular structure after connecting the first reinforcing rod and the second reinforcing rod so as to further improve the structural stability of the first reinforcing member by utilizing the characteristics of strong stability of the triangular structure.

According to the above-described aspect, it is possible to increase two points for the vehicle body reinforcing structure to connect to the vehicle body by providing the two connection brackets. On the other hand, due to the two connection brackets, it is possible to connect the first reinforcing rod to the reinforcing portion and connect the second reinforcing rod to the reinforcing portion so as to improve the structural stability of the vehicle body reinforcing structure. The connection bracket is connected at the first bending portion of the first reinforcing rod and inclined toward the direction of the intermediate portion of the reinforcing portion such that part of the structure of the connection bracket and the first reinforcing rod and part of the structure of the reinforcing portion form the approximate triangular structure. The other connection bracket is connected at the second bending portion of the second reinforcing rod and inclined toward the direction of the intermediate portion of the reinforcing portion such that part of the structure of the connection bracket and the second reinforcing rod and part of the structure of the reinforcing portion form the approximate triangular structure. Thus, the stability of the vehicle body reinforcing structure is improved. In a projection of the vehicle body reinforcing structure on the first reference plane, the two connection brackets divides the area formed by the outer edge of the projection of the vehicle body reinforcing structure on the first reference plane into three parts having the same or similar area with each other such that the force with respect to the vehicle body reinforcing structure is further balanced and the structural stability is further improved.

According to the above-described aspect, the first strut and the second strut of the second reinforcing rod are connected to the two sides of the first reinforcing rod to form the cross connection portion such that it is possible to avoid the first reinforcing rod and the second reinforcing rod from interfering with each other when the first reinforcing rod and the second reinforcing rod cross to connect with each other and avoid the thickness of the first reinforcing member from becoming relatively large, thus the first reinforcing member takes up less space.

According to the above-described aspect, the vehicle body reinforcing structure is provided beside the battery pack of the vehicle body such that it is possible to enhance the body rigidity near the battery pack.

The present embodiment further provides a vehicle including the vehicle body 100, the battery pack 200 and the vehicle body reinforcing structure described in any one of the above-described example. The vehicle body reinforcing structure is provided in the vicinity the battery pack 200 of the vehicle body 100 and both the first reinforcing structure and the second reinforcing structure of the vehicle body reinforcing structure are connected to the vehicle body 100 so as to increase the rigidity of the vehicle body 100 close to the battery pack 200.

According to an example, at least a portion of the vehicle body reinforcing structure is connected to the battery pack 200 so as to make the battery pack 200 to be connected to the vehicle body 100 via the vehicle body reinforcing structure and thus improve the stability of the battery pack 200.

According to an example, the battery pack 200 is installed in the rear portion of the vehicle body 100 and positioned in the region of the bottom portion of the vehicle body 100. The vehicle body reinforcing structure is positioned at the rear side of the battery pack 200. The left end and the right end of the first reinforcing member 300 are respectively connected to the left side and the right side of the vehicle body 100, the left end and the right end of the second reinforcing member 400 are respectively connected to the left side and the right side of the vehicle body 100, the first reinforcing member 300 and the second reinforcing member 400 are respectively connected to the connection bracket 500, and the two ends of the connection bracket 500 are respectively connected to the battery pack 200 and the vehicle body 100. The vehicle body reinforcing structure is connected to the battery pack in the rear portion of the battery pack 200, and the vehicle body reinforcing structure is connected to the vehicle body 100 such that the vehicle body reinforcing structure reinforces the structural strength of the region in the rear portion of the vehicle body 100 where the battery pack 200 is installed while improving the stability of the battery pack 200.

As shown in FIG. 1 to FIG. 3, a vehicle body reinforcing structure that is installed in a vehicle according to the present disclosure is provided, wherein the vehicle includes a vehicle body 100 and a battery pack 200 and the battery pack is arranged inside the vehicle body 100. The vehicle body reinforcing structure includes a first reinforcing member 300 and a second reinforcing member 400, wherein the first reinforcing member 300 and the second reinforcing member 400 extend along a length direction of a side surface of the battery pack 200. Tow ends of the first reinforcing member 300 are connected to the vehicle body 100 respectively, and the first reinforcing member 300 at least includes a cross-connection portion 310. The second reinforcing member 400 at least includes a reinforcing portion 410 extending along the length direction of the side surface of the battery pack 200, and two ends of the second reinforcing member 400 are connected to the vehicle body 100 respectively.

The vehicle body reinforcing structure provided by the present embodiment is arranged in the vehicle including the battery pack 200 and arranged near the battery pack 200, wherein the vehicle body reinforcing structure may be installed at either side of the battery pack 200. The first reinforcing member 300 and the second reinforcing member 400 are positioned at the same side of the battery pack 200. The first reinforcing member 300 at least includes one cross-connection portion 310 and the second reinforcing member 300 at least includes one reinforcing portion 410 extending along the length direction of the side surface of the battery pack 200 so as to significantly improve the structural strength of the vehicle body reinforcing structure. The first reinforcing member 300 and the second reinforcing member 400 are provided at the side surface of the battery pack 200 respectively and connected to the vehicle body 100 to strengthen the vehicle body 100 near the battery pack 200 by the vehicle body reinforcing structure so as to improve the structural rigidity of the vehicle body 100 near the battery pack 200 and overcome the imbalance of the vehicle due to lack of the rigidity.

In an example, the vehicle body reinforcing structure is installed at the front side or the rear side of the battery pack 200, wherein the left side and right side of the first reinforcing member 300 are fixed to the left side and right side of the vehicle body 100 respectively, and the left side and right side of the second reinforcing member 400 are fixed to the left side and right side of the vehicle body 100 respectively. During the driving process of the vehicle, the shaking is usually the largest when starting and braking, and most of the shakings occurred at this time are shakings in the front-rear side. Thus, by installing the vehicle body reinforcing structure at the front side or the rear side of the battery pack 200, the side surface of the first reinforcing member 300 and the second reinforcing member 400 facing the battery pack 200 limit the position of the battery pack 200 to a certain extent so as to achieve a better fixing effect with respect to the battery pack 200 at the starting or braking of the vehicle and improve the stability of the battery pack 200.

In a specific example, the second reinforcing member 400 includes the reinforcing portion 410 arranged to extend along the left-right direction, and when the left end and the right end of the second reinforcing member 400 are connected to the left side and right side of the vehicle body 100 respectively, the central axis of the reinforcing portion 400 is parallel to the horizontal plane and extends along the left-right direction. When the number of reinforcing members 410 is multiple, the axes of the reinforcing members 410 are parallel to each other and arranged at intervals with each other.

In another example, the axis of the reinforcing member 410 intersects the horizontal plane and extends along the left-right direction.

In another applicable example, the left end of the reinforcing portion 410 and the left end of the first reinforcing member 300 may be connected together and then connected to the left side of the vehicle body 100, and the right end of the reinforcing portion 410 and the right end of the first reinforcing member 300 may be connected together and then connected to the right side of the vehicle body 100.

In another applicable example, the end portions of the reinforcing portion 410 are connected to the two sides of the vehicle body 100 rather than connecting to the end portions of the first reinforcing member 300 respectively.

When the number of the reinforcing portion is multiple, it is possible to connect the left ends of the plurality of reinforcing members 410 by an auxiliary connection structure and then connect the left ends thereof to the left side of the vehicle body 100 together, and it is possible to connect the right ends of the plurality of reinforcing members 410 by the auxiliary connection structure and then connect the right ends thereof to the right side of the vehicle body 100 together. Or the left end and the right end of each reinforcing member 410 are individually connected to the left side and the right side of the vehicle body 100 respectively.

The reinforcing portion 410 may be a plate-shaped structure, a rod-shaped structure, an I-beam structure, or the structure in other shapes. As an example shown in FIG. 3, the reinforcing portion 410 is a crossbar and the left end and right end thereof are connected to the left side and right side of the vehicle body 100.

When the reinforcing portion 410 is the crossbar, for facilitating connecting the end portions of the reinforcing portion 410 to the vehicle body 100, it is optionally provide first mounting bases 420 at the two ends of the reinforcing portion 410 respectively. One end of the first mounting base 420 is sheathed in and fixed to the end portion of the reinforcing portion 410, and the first mounting base 420 includes a mounting stand. The mounting stand is formed in the flat structure so as to facilitate coming into contact with the planar portion in the vehicle body 100, increasing the contact area with the vehicle body 100, and facilitate fixing and connecting the first mounting base 420 to the vehicle body 100. The surface shape of the mounting stand may match the shape of the surface area in the vehicle body 100 for connecting the reinforcing portion 410, for example, when the surface of the structure in the vehicle body 100 for connecting the reinforcing portion 410 is a curved surface, the surface of the mounting stand has a curved surface having the same radian with that of the curved surface of the vehicle body 100 so as to make the sticking area with the vehicle body 100 to become larger and make the connection stability to become stronger. It is possible to provide a through-hole on the first mounting base 420 for facilitating connecting the first mounting base 420 to the vehicle body 100 by screws.

Optionally, the first mounting base 420 and the reinforcing portion 410 may be an integrated structure.

In a specific example, the second reinforcing member 400 includes one reinforcing portion 410, and the reinforcing portion 410 is a crossbar that is a hollow bar. It is possible to reduce the weight of the crossbar and reduce the cost by forming the crossbar as the hollow bar.

In an example, the first reinforcing member 300 is an integral structure that is manufactured by the one-piece molding and has at least one cross-connection portion 310. In other hand, as shown in FIG. 1 to FIG. 3, in another example, the first reinforcing member 300 includes a plurality of rod-shaped structure, and the plurality of rod-shaped structure are cross-connected to form the cross-connection portion 310. For example, the first reinforcing member 300 includes a first reinforcing rod 320 and a second reinforcing rod 330, and the first reinforcing rod 320 and the second reinforcing rod 330 are cross-connected to form the cross-connection portion 310. The first reinforcing rod 320 and the second reinforcing rod 330 are crossed means that the axis of the first reinforcing rod 320 and the axis of the second reinforcing rod 330 intersects each other and the axis of the first reinforcing rod 320 and the axis of the second reinforcing rod 330 are not parallel to each other and are not coincided with each other. Compared with the first reinforcing member 300 manufactured by the one-piece molding, the singular rod-shaped structure is relatively simple such that during the manufacturing process, it is easy to manufacture the first reinforcing member 300 including the first reinforcing rod 320 and the second reinforcing rod 330 and reduce the production costs.

The number of the first reinforcing rods 320 may be single or multiple, and the number of the second reinforcing rods 330 may be single or multiple. For example, according to one arrangement, the number of the first reinforcing rod 320 is one, and the number of the second reinforcing rods 330 is multiple, wherein the plurality of second reinforcing rods 330 arranged at intervals with each other, and each of the plurality of second reinforcing rods 330 is cross-connected with the first reinforcing rod 320 such that the cross-connection portion 310 is formed at each position where the first reinforcing rod 320 is cross-connected with each second reinforcing rod 330. According to another arrangement, the number of the first reinforcing rod 320 is multiple, and the number of the second reinforcing rods 330 is single, wherein the plurality of first reinforcing rods 320 arranged at intervals with each other, and each of the plurality of first reinforcing rods 320 is cross-connected with the second reinforcing rod 330 such that the cross-connection portion 310 is formed at each position where the second reinforcing rod 330 is cross-connected with each first reinforcing rod 320. According to a further arrangement, the number of the first reinforcing rods 320 and the number of the second reinforcing rods 330 are multiple, and the plurality of first reinforcing rods 320 and the plurality of second reinforcing rods 330 are cross-connected to form a grid structure, wherein the cross-connection portion 310 is formed at each intersecting portion.

According to the three arrangement shown above, there are multiple cross-connection portions 310 formed in the first reinforcing member 300. In the arrangement shown below, the number of the cross-connection portion is single. As shown in FIG. 2, the first reinforcing member 300 includes one first reinforcing rod 320 and one second reinforcing rod 330, and one cross-connection portion 310 is formed by the single first reinforcing rod 320 and the single second reinforcing rod 330, thus this type of first reinforcing member 300 has a simple structure for the assembly.

In an example, as shown in FIG. 4, the axis of the first reinforcing rod 320, the axis of the second reinforcing rod 330, and the axis of the reinforcing portion 410 are coplanar with the first reference plane W1. In other words, the axis of the first reinforcing rod 320, the axis of the second reinforcing rod 330, and the axis of the reinforcing portion 410 are on the same plane and the plane is the first reference plane W1. By arranging the first reinforcing rod 320, the second reinforcing rod 330, and the reinforcing portion 410 on the same plane, it is possible to further balance the force received by the vehicle body reinforcing structure to improve the stability of the vehicle body reinforcing structure. Also, the first reinforcing rod 320, the second reinforcing rod 330, and the reinforcing portion 410 are arranged on the same plane so as to reduce the space occupied by the vehicle body reinforcing structure and facilitate the arrangement of other structure in the vehicle body 100.

In an applicable example, the first reinforcing rod 320 and/or the second reinforcing rod 330 may be straight rods.

Or in another applicable example as shown in FIG. 1 to FIG. 3, both the first reinforcing rod 320 and the second reinforcing rod 330 have one bending portion respectively, the first reinforcing rod 320 and the reinforcing portion 410 encircle a space to form a triangle, and the second reinforcing rod 330 and the reinforcing portion 410 encircle a space to form another triangle. For facilitating the distinction, the bending portion of the first reinforcing rod 320 is referred to as a first bending portion, and the bending portion of the second reinforcing rod 330 is referred to as a second bending portion. More specifically, in the first reinforcing rod 320, the regions positioned at the two end portions of the first bending portion are arranged to be relatively inclined and when the first bending portion forms a right angle, the first reinforcing rod 320 forms an L-shaped structure. Similarly, in the second reinforcing rod 330, the regions positioned at the two end portions of the second bending portion are arranged to be relatively inclined and when the second bending portion forms a right angle, the second reinforcing rod 330 forms an L-shaped structure. Both the angles of the first bending portion and the second bending portion are between 0 degree and 180 degrees, and are not limited to 90 degrees. The reinforcing portion 410 is formed in the structure to extend laterally such that the reinforcing portion 410 forms the triangular structure with the first reinforcing rod 320 having the first bending portion and the second reinforcing rod 330 having the second bending portion. The triangular structure has a relatively high stability such that the vehicle body reinforcing structure with at least two triangular structure formed therein has a higher stability.

It is noted that when the first reinforcing rod 320 is an integral rod-shaped structure, the region that is bending in the first reinforcing rod 320 is the first bending portion. For example, in a case in which the first reinforcing rod 320 is manufactured by bending a straight rod, the portion that is bent is the first bending portion. When the first reinforcing rod 320 is a combination of multiple rod-shaped structure, one rod-shaped structure is bent to form the first bending portion and the first bending portion includes two end portions, and the axes of the two end portions intersect each other. The other rod-shaped structure in the first reinforcing rod 320 are the straight rods and each straight rod is coaxial with either end portion of the first bending portion. Similarly, when the second reinforcing rod 330 is an integral rod-shaped structure, the region that is bending in the second reinforcing rod 330 is the second bending portion. For example, in a case in which the second reinforcing rod 330 is manufactured by bending a straight rod, the portion that is bent is the second bending portion. When the second reinforcing rod 330 is a combination of multiple rod-shaped structure, one rod-shaped structure is bent to form the second bending portion and the second bending portion includes two end portions, and the axes of the two end portions intersect each other. The other rod-shaped structure in the second reinforcing rod 330 are the straight rods and each straight rod is coaxial with either end portion of the second bending portion.

According to an applicable design, the first reinforcing rod 320 and the second reinforcing rod 330 intersect each other to form the cross-connection portion 310, a first end of the first reinforcing rod 320 and a first end of the second reinforcing rod 330 are connected to form the first fixing portion, and the first reinforcing rod 320 and the second reinforcing rod 330 form the triangular structure between the first fixing portion and the cross-connection portion 310. Since the triangular structure has the strong stability, the first reinforcing rod 320 and the second reinforcing rod 330 that are connected to form the triangular structure have the high structural stability.

According to an applicable design, a second end of the first reinforcing rod 320 and a second end of the second reinforcing rod 330 are connected to form the second fixing portion, and the first reinforcing rod 320 and the second reinforcing rod 330 form the triangular structure between the second fixing portion and the cross-connection portion 310. Since the triangular structure has the strong stability, the first reinforcing rod 320 and the second reinforcing rod 330 that are connected to form the triangular structure have the high structural stability.

According to an applicable design, the first reinforcing rod 320 and the second reinforcing rod 330 intersect each other to form the cross-connection portion 310, the first end of the first reinforcing rod 320 and the first end of the second reinforcing rod 330 are connected to form the first fixing portion, and the second end of the first reinforcing rod 320 and the second end of the second reinforcing rod 330 are connected to form the second fixing portion such that the first reinforcing rod 320 and the second reinforcing rod 330 form the triangular structure between the first fixing portion and the cross-connection portion 310, and the first reinforc- ing rod 320 and the second reinforcing rod 330 form another triangular structure between the second fixing portion and the cross-connection portion 310. According to this arrange- ment, there are at least two triangular structure formed after connecting the first reinforcing rod 320 and the second reinforcing rod 330 so as to enhance the structural stability of the first reinforcing member 300 by utilizing the high stability characteristic of the triangular structure.

As an example, the left end of the first reinforcing rod 320 and the left end of the second reinforcing rod 330 are connected to form the first fixing portion, and the right end of the first reinforcing rod 320 and the right end of the second reinforcing rod 330 are connected to form the second fixing portion. On the left-right direction, the cross-connec- tion portion 310 is positioned between the first fixing portion and the second fixing portion. The first bending portion is positioned between the first fixing portion and the cross- connection portion 310, and the second bending portion is positioned between the second fixing portion and the cross- connection portion 310. In other words, the structure of the first reinforcing rod 320 positioned at the left side of the cross-connection portion 310 and the structure of the second reinforcing rod 330 positioned at the left side of the cross- connection portion 310 are connected to form the triangular structure, and the structure of the first reinforcing rod 320 positioned at the right side of the cross-connection portion 310 and the structure of the second reinforcing rod 330 positioned at the right side of the cross-connection portion 310 are connected to form the other triangular structure.

In order to facilitate connecting the first reinforcing rod 320 and the second reinforcing rod 330, the vehicle body reinforcing structure further includes a second mounting base 340 and a third mounting base 350, wherein the second mounting base 340 is configured to connect the end portion of the first reinforcing rod 320 and the end portion of the second reinforcing rod 330 so as to form the first fixing portion and the second fixing portion, the third mounting base 350 is configured to connect the portions of the first reinforcing rod 320 and the second reinforcing rod 330 that intersect each other to form the cross-connection portion 310.

According to an example, as shown in FIG. 1 to FIG. 3, in the vehicle body reinforcing structure, the number of the second mounting bases 340 is two, and the two second mounting bases 340 are positioned at the two ends of the first reinforcing rod 320 respectively, wherein one of the two second mounting bases 340 is sheathed and fixed to the left end of the first reinforcing rod 320 and the left end of the second reinforcing rod 330 so as to connect the left end of the first reinforcing rod 320 and the left end of the second reinforcing rod 330. The other second mounting base 340 is sheathed and fixed to the right end of the first reinforcing rod 320 and the right end of the second reinforcing rod 330 so as to connect the right end of the first reinforcing rod 320 and the right end of the second reinforcing rod 330. The second mounting base 340 may include a first fixing member and a second fixing member, and two concave portions are pro- vided in the first fixing member and the second fixing member respectively. During the assembly process, the end portion of the first reinforcing rod 320 is placed in one concave portion of the first fixing member, the end portion of the second reinforcing rod 330 is placed in the other concave portion of the first fixing member, and the second fixing member is buckled to the first fixing member so as to make the two concave portions of the second fixing member are buckled to the first reinforcing rod 320 and the second reinforcing rod 330 respectively. Then, the first fixing mem- ber and the second fixing member are connected and fixed so as to finish the assembly of connecting and fixing the end portion of the first reinforcing rod 320 and the end portion of the second reinforcing rod 330 by the second mounting base 340. The first reinforcing member 300 may connected to the vehicle body 100 by the two mounting bases 340.

According to an example, the third mounting base 350 includes a third fixing member and a fourth fixing member, and two concave portions are provided in the third fixing member and the fourth fixing member respectively. During the assembly process, the intersecting portion of the first reinforcing rod 320 and the second reinforcing rod 330 is placed in the concave portion of the third fixing portion and the fourth fixing member is buckled on the third fixing member so as to make the concave portion of the fourth fixing member is buckled on the intersecting portion of the first reinforcing rod 320 and the second reinforcing rod 330. Subsequently, the third fixing member and the fourth fixing member are connected to each other so as to finish the assembly of cross-connecting the first reinforcing rod 320 and the second reinforcing rod 330 to form the cross-connection portion 310.

According to an example, the vehicle body reinforcing structure may further include a connection bracket being connectable to the vehicle body 100, and at least one of the first reinforcing member 300 and the second reinforcing member 400 is connected to the vehicle body 100 via the connection bracket 500. In other words, it is possible that only the first reinforcing member 300 is connected to the connection bracket 500, or only the second reinforcing member 400 is connected to the connection bracket 500, or the first reinforcing member 300 and the second reinforcing member 400 may be connected to the connection bracket 500 respectively. The first reinforcing member 300 and the second reinforcing member 400 are connected to the vehicle body 100 respectively and the connection bracket 500 is connected to the vehicle body 100 so as to increase the connection points between the vehicle body reinforcing structure and the vehicle body 100 by providing the connection bracket 500 and thus improve the connection stability between the vehicle body reinforcing structure and the vehicle body 100.

According to an example, the vehicle body reinforcing structure is connected to the battery pack 200. More specifically, at least one of the first reinforcing member 300 and the second reinforcing member 400 may be connected to the battery pack 200, or the connection bracket 500 may be connected to the battery pack 200. By connecting the vehicle body reinforcing structure to the battery pack 200, the battery pack 200 is connected to the vehicle body 100 via the vehicle body reinforcing structure so as to avoid the shaking of the battery pack 200 during the travelling of the vehicle and improve the stability of the battery pack 200.

According to an applicable design, the connection bracket 500 in the vehicle body reinforcing structure is connected to the battery pack 200. As shown in FIG. 1 to FIG. 3, one end of the connection bracket 500 includes a first connection portion 510, and the other end of the connection bracket 500 includes a second connection portion 520, the first connection portion 510 is connected to the battery pack 200 and the second connection portion 520 is connected to the vehicle body 100. More specifically, the first connection portion 510 is connected to the side surface of the battery pack 200 and the second connection portion 520 is connected to the bottom portion of the crossbeam of the vehicle body 100.

As shown in FIG. 1 and FIG. 4, the region of the battery pack 200 for connecting the first connection portion 510 is referred to as the second connection point 210, and the region of the vehicle body 100 for connecting the second connection portion 520 is referred to as the first connection point 110.

As shown in FIG. 2, the first connection portion 510 and the second connection point 210 of the battery pack 200 may be connected by the screws. The first connection portion 510 is provided with the first installation hole 511 for passing through the screws so as to connect the first connection portion 510 and the second connection point 210 of the battery pack 200 by the screws. As shown in FIG. 3, the second connection portion 520 and the first connection point 110 of the vehicle body 100 may be connected by the screws. The second connection portion 520 is provided with the second installation hole 521 for passing through the screws so as to connect the second connection portion 520 and the first connection point 110 of the vehicle body 100.

According to an example, the first connection portion 510 and the second connection portion 520 may be provided at the same side or the different sides of the vehicle body reinforcing structure. For example, when the vehicle body reinforcing structure is provided at the front side or the rear side of the battery pack 200, the first reinforcing member 300 and the second reinforcing member 400 extend along the left-right direction such that both the first connection portion 510 and the second connection portion 520 may be provided in the front-side region or the rear-side region of the vehicle body reinforcing structure, or either of the first connection portion 510 or the second connection portion 520 may be provided in the front-side region of the vehicle body reinforcing structure, and the other may be provided in the rear-side region of the vehicle body reinforcing structure.

When the axis of the first reinforcing rod 320 and the axis of the second reinforcing rod 330 in the first reinforcing member 300, and the axis of the reinforcing portion 410 of the second reinforcing member 400 are on the same first reference plane W1, as shown in FIG. 5 and FIG. 7, according to an applicable example, both the first connection portion 510 and the second connection portion 520 are positioned on the same side of the first reference plane W1. On the other hand, as shown in FIG. 4 and FIG. 6, according to another applicable example, the first connection portion 510 is positioned on the first side of the first reference plane W1, and the second connection portion 520 is on the second side of the first reference plane W1.

As shown in FIG. 4 and FIG. 5, when the lateral distance between the projections of the first connection point 110 of the battery pack 200 and the second connection point 210 of the vehicle body 100 on the horizontal plane is equal to or larger than a predetermined distance, if the first connection portion 510 and the second connection portion 520 are arranged on the different sides of the first reference plane W1, the angle formed between the first reference plane W1 and the horizontal plane W2 is referred to as $\alpha$ (as shown in FIG. 4). If the first connection portion 510 and the second connection portion 520 are arranged on the same side of the first reference plane W1, the angle formed between the first reference plane W1 and the horizontal plane W2 is referred to as $\beta$ (as shown in FIG. 5) and the angle $\alpha$ and the angle $\beta$ satisfies the formula as 90 degrees$<\alpha<\beta$. That is, the angle R is larger than the angle $\alpha$, and the angle $\alpha$ is larger than 90 degrees. Since the angle between the first reference plane W1 and the horizontal plane W2 is closer to 90 degrees, the stability thereof is relatively higher, thus in this case, the first connection portion 510 and the second connection portion 520 are arranged on the different sides of the first reference plane W1. Here, the predetermined distance may be determined according to the actual requirements and it is not particularly limited in this example.

That is, the configuration of arranging the first connection portion 510 and the second connection portion 520 at the different sides of the first reference plane W1 is suitable for the case in which the lateral distance between the first connection point 110 and the second connection point 210 is relatively far from each other. By arranging the first connection portion 510 and the second connection portion 520 at the different sides of the first reference plane W1, it is possible to connect the vehicle body reinforcing structure to each of the first connection point 110 and the second connection point 210 while decreasing the inclination angle of the first reference plane W1 with respect to the horizontal plane W2 to make the inclination angle to be further closer to 90 degrees so as to improve the structural stability of the vehicle body reinforcing structure.

As shown in FIG. 6 and FIG. 7, based on the similar principle, when the lateral distance between the projections of the first connection point 110 of the battery pack 200 and the second connection point 210 of the vehicle body 100 on the horizontal plane is smaller than the predetermined distance (for example, there is a partial overlapping region between the projections of the first connection point 110 of the battery pack 200 and the second connection point 210 of the vehicle body 100, or the projections of the first connection point 110 of the battery pack 200 and the second connection point 210 of the vehicle body 100 completely overlap each other), compared with the arrangement of arranging the first connection portion 510 and the second connection portion 520 on both sides of the first reference plane W1 as shown in FIG. 6, the arrangement of arranging the first connection portion 510 and the second connection portion 520 on the same side of the first reference plane W1 as shown in FIG. 7 is more suitable to improve the structural stability of the vehicle body reinforcing structure and facilitate the arrangement and installation of the structure.

According to an example, as shown in FIG. 3, the connection bracket 500 includes a groove portion 531. A concave groove portion is formed in the connection bracket 500 to form the groove portion 531. At the time of connecting the connection bracket 500 to the first reinforcing member 300 or the second reinforcing member 400, the first reinforcing member 300 or the second reinforcing member 400 connected with the connection bracket 500 extends into the groove so as to increase the contact area between the connection bracket 500 and the first reinforcing member 300 or the second reinforcing member 400 connected with the connection bracket 500 and improve the connection stability between the connection bracket 500 and the corresponding first reinforcing member 300 or the second reinforcing member 400.

According to another example, the connection bracket 500 includes a covering portion, wherein the covering portion covers the outer side wall of the first reinforcing member 300 and the second reinforcing member 400 connected to the connection bracket 500. In an applicable case, the covering portion includes an arc-shaped extension portion, wherein the arc-shaped extension portion forms a covering cavity for covering the first reinforcing member 300 or the second reinforcing member 400 connected to the connection bracket 500. As shown in FIG. 3, in another applicable case, the connection bracket 500 includes a main bracket 530 and an auxiliary bracket 540, wherein the main bracket is provided with the groove portion 531, and the auxiliary bracket 540 is provided with a groove. After the main bracket 530 and the auxiliary bracket 540 are connected with each other, the groove of the auxiliary bracket 540 is relatively communicated with the groove of one groove portion 531 of the main bracket 530 to form the covering cavity for covering the outer wall of the first reinforcing member 300 or the second reinforcing member 400 connected to the connection bracket 500 so as to further increase the contact area of the first reinforcing member 300 or the second reinforcing member 400 connected thereto.

In FIG. 1 to FIG. 3, one connection bracket 500 is respectively connected to the first reinforcing member 300 and the second reinforcing member 400, and there are three connections. The groove portions 531 respectively corresponding to the three connections are provided in the main bracket 530, and the auxiliary bracket 540 is connected thereto in one of the three groove portions 531 to form one covering portion. It is noted that the number of the auxiliary brackets 540 may be two or three so as to form two or three covering portions in the connection bracket 500.

More specifically, the main bracket 530 and the auxiliary bracket 540 are positioned at two sides of the first reference plane W1.

According to an applicable design, the number of the connection brackets is two, and when the first reinforcing member 300 includes the first reinforcing rod 320 and the second reinforcing rod 30, one of the two connection brackets 500 is respectively connected to the first reinforcing rod 320 and the reinforcing portion 410, and the other connection bracket 500 is respectively connected to the second reinforcing rod 330 and the reinforcing portion 410. According to the above-described configuration, on the one hand, two connection points for connecting to the vehicle body 100 are increased in the vehicle body reinforcing structure by providing two connection brackets 500, and on the other hand, the first reinforcing rod 320 and the reinforcing portion 410 are connected with each other while the second reinforcing rod 330 and the reinforcing portion 410 are connected with each other via the two connection brackets 500 so as to improve the structural stability of the vehicle body reinforcing structure.

According to an applicable design, one connection bracket 500 is connected with the bending portion (first bending portion) of the first reinforcing rod 320, and the connection bracket 500 is arranged to be inclined toward the direction of the intermediate portion of the reinforcing portion 410 and connected to the reinforcing portion 410, and another connection bracket 500 is connected with the bending portion (second bending portion) of the second reinforcing rod 330, and the other connection bracket 500 is arranged to be inclined toward the direction of the intermediate portion of the reinforcing portion 410 and connected to the reinforcing portion 410. The first bending portion and the second bending portion are at different sides of the cross-connection portion 310. As an example, when both the first reinforcing member 300 and the second reinforcing member 400 extend along the left-right direction, the cross-connection portion 310 is positioned in the central region of the first reinforcing member 300, either of the first bending portion or the second bending portion is positioned in the left-side region of the cross-connection portion 310, and the other of the first bending portion or the second bending portion is positioned in the right-side region of the cross-connection portion 310. If the first bending portion is positioned at the left side and the second bending portion is positioned at the right side, the top end of the connection bracket 500 at the left side is connected to the first bending portion, and the bottom end thereof is inclined from the left side toward the right side and extends toward the lower side to be connected to the reinforcing portion 410. The top end of the connection bracket 500 at the right side is connected to the second bending portion, and the bottom end thereof is inclined from the right side toward the left side and extends toward the lower side to be connected to the reinforcing portion 410.

As an example, as shown in FIG. 2, the cross-connection portion 310 formed by the first reinforcing rod 320 and the second reinforcing rod 330 cross-connecting with each other is positioned between the first bending portion and the second bending portion, and the distance between the projections of the cross-connection portion 310 and the first bending portion on the horizontal plane is equal to or close to the distance between the projections of the of the cross-connection portion 310 and the second bending portion on the horizontal plane, thus the intermediate portion of the first reinforcing rod 320 and the intermediate portion of the second reinforcing rod 330 cross-connects to each other to form the cross-connection portion 310.

The connection bracket 500 is connected to the bending portion of the first reinforcing rod 320 and inclined toward the direction of the intermediate portion of the reinforcing portion 410 such that the connection bracket 500 forms the approximately triangular structure with part of the structure of the first reinforcing rod 320 and part of the structure of the reinforcing portion 410. The other connection bracket 500 is connected to the bending portion of the second reinforcing rod 330 and inclined toward the direction of the intermediate portion of the reinforcing portion 410 such that the connection bracket 500 forms the approximately triangular structure with part of the structure of the second reinforcing rod 330 and part of the structure of the reinforcing portion 410. Thus, it is possible to improve the stability of the vehicle body reinforcing structure. At the same time, in the projections of the vehicle body reinforcing structure on the first reference plane W1, the two connection brackets divides the region being encircled by the outer edge of the projections of the vehicle body reinforcing structure on the first reference plane W1 into three portions whose areas are close to or equal to each other so as to further balance the force received by the vehicle body reinforcing structure and improve the structural stability.

In a specific example, the bending portion includes two bending positions and a platform portion is formed between the two bending positions, wherein the arrangement of the platform portion facilitates the installation and the fixation of the connection bracket 500. For example, taking the process of manufacturing the bending portion by a straight rod as an example, wherein two ends of the straight rod is referred to as a first end and a second end, in the case in which a first bending position is formed by performing a bending between the first end and the second end, and a second bending position is formed by performing another bending between the first bending position and the second end, the segment of the rod between the first bending position and the second bending position forms the platform portion.

The first bending portion of the first reinforcing rod 320 includes the above-described platform portion, and/or the second bending portion of the second reinforcing rod 330 includes the above-described platform portion. For example, the vehicle body reinforcing structure includes two connection brackets 500, and both the first bending portion of the first reinforcing rod 320 and the second bending portion of the second reinforcing rod 330 include the platform portion respectively. The second connection portion 520 of one connection bracket 500 is communicated with the platform portion of the first bending portion, and the second connection portion 520 of the other connection bracket 500 is communicated with the platform portion of the second bending portion.

According to an applicable design, the second reinforcing rod 330 includes a first strut 331 and a second strut 332, wherein the second strut 332 includes the bending portion, and the first strut 331 and the second strut 332 are respectively connected to two sides of the first reinforcing rod 320 to form the cross-connection portion 310 with the first reinforcing rod 320. That is, the second reinforcing rod 330 includes the combination rod formed of the first strut 331 and the second strut 332. The combination rod and the first reinforcing rod 320 are connected with each other to form the cross-connection portion 310. The second reinforcing rod 330 may include one combination rod or a plurality of combination rods so as to form one cross-connection portion 310 or a plurality of cross-connection portions 310 by connecting with the first reinforcing rod 320. More specifically, the axis of the first strut 331 is coincided with the extension of the axis of the second strut 332, and the axis of the first strut, the axis of the second strut 332, and the axis of the first reinforcing rod 320 are on the same plane as the first reference plane W1. By respectively connecting the individually provided first strut 331 and the second strut 332 of the second reinforcing rod 330 to the two sides of the first reinforcing rod 320, it is possible to ensure the formation of the cross-connection portion 310 with the first reinforcing portion 320 while avoiding the thickness of the first reinforcing member 300 from being relatively large due to the interference between the first reinforcing rod 320 and the second reinforcing rod 330 occurred when the first reinforcing rod 320 and the second reinforcing rod 330 cross-connects with each other so as to make the first reinforcing member 300 to occupy less space.

In an example, both the first reinforcing rod 320 and the second reinforcing rod 330 are hollow rods so as to decrease the gross weight of the first reinforcing member 300.

According to an example, the vehicle body reinforcing structure is installed at the bottom side of the vehicle body 100 and close to the rear portion of the battery pack 200 such that the vehicle body reinforcing structure is connected to the battery pack 200 from the rear portion of the battery pack 200 to reinforce the rear portion of the vehicle body 100 and improve the stability of the battery pack 200. As shown in FIG. 1 to FIG. 4, the vehicle body reinforcing structure includes the first reinforcing member 300, the second reinforcing member 400, and the connection bracket 500. The second reinforcing member 400 includes the reinforcing portion 400, wherein the reinforcing portion 400 is the crossbar, and the left end and the right end of the crossbar are connected to the left side and the right side of the vehicle body 100 via the first mounting base 420 respectively. The first reinforcing member 300 includes the first reinforcing rod 320 and the second reinforcing rod 330, wherein the second reinforcing rod 330 includes the first strut 331 and the second strut 332, and the first strut 331 and the second strut 332 are respectively connected to the two sides of the intermediate portion of the first reinforcing rod 320 via the third mounting base 350 to form the cross-connection portion 310. The left side of the first strut 331 and the left end of the first reinforcing rod 320 are connected via one second mounting base 340, and the right end of the second strut 332 and the right end of the first reinforcing rod 320 are connected via another second mounting base 340. The two of second mounting bases 340 are connected to the left side and the right side of the vehicle body 100 respectively. All of the first strut 331, the second strut 332, the first reinforcing rod 320, and the crossbar are hollow rods, and the axis of the first strut 331, the axis of the second strut 332, the axis of the first reinforcing rod 320, and the axis of the crossbar are on the same plane, that is, the first reference plane W1. In the projection of the vehicle body reinforcing structure on the first reference plane W1, the crossbar is positioned at the lower side of the first strut 331, the second strut 332, and the first reinforcing rod 320. The second strut 332 includes the second bending portion in the right-side region of the cross-connection portion 310, and the first reinforcing rod 320 includes the first bending portion in the left-side region of the cross-connection portion 310. Accordingly, the projections of the first reinforcing rod 320 and the reinforcing portion 410 on the first reference plane W1 are in the triangular shape, and the projections of the second reinforcing rod 330 and the reinforcing portion 410 on the first reference plane W1 are in the triangular shape. The first strut 331 and the structure of the first reinforcing rod 320 that is positioned at the left side of the cross-connection portion 310 form the triangular structure, and the second strut 332 and the structure of the first reinforcing rod 320 that is positioned at the right side of the cross-connection portion 320 form the triangular structure. The number of the connection brackets 500 is two, wherein one of the two connection brackets 500 is connected to the first bending portion, the first strut 331 and the crossbar, and the other connection bracket 500 is connected to the second bending portion, the partial structure of the first reinforcing rod 320 that is positioned at the right side of the cross-connection portion 310, and the crossbar. The two connection brackets 500 are inclined toward the direction of the intermediate portion of the crossbar from the upper side to the lower side, that is, the connection bracket 500 positioned at the left side is inclined toward the lower right side, and the connection bracket 500 positioned at the right side is inclined toward the lower left side. Both the connection brackets include the main bracket 530 and the auxiliary bracket 540 respectively, the groove portions 531 corresponding to the three connection positions are provided in the main bracket 530 positioned at the left side, and the auxiliary bracket 540 is connected to the top portion of the main bracket 530 so as to communicate with the groove portion 531 provided at the uppermost side of the main bracket 530 to form the covering portion. The covering portion covers the outer side of the first bending portion, and the covering portion at least covers about ¾ of the region in the outside of the circumference of the first bending portion. The groove portions 531 corresponding to the three connection positions are provided in the main bracket 530 positioned at the right side, and the auxiliary bracket 540 is connected to the top portion of the main bracket 530 so as to communicate with the groove portion 531 provided at the uppermost side of the main bracket 530 to form the covering portion. The covering portion covers the outer side of the second bending portion, and the covering portion at least covers about ¾ of the region in the outside of the circumference of the second bending portion. The top portion of the connection bracket 500 includes the first connection portion 510 for connecting to the battery pack 200, and the bottom portion of the connection bracket 500 includes the second connection portion 520 for connecting to the bottom side of the vehicle body 100. The first connection portion is positioned at the side facing the battery pack 200 in the top portion of the first reinforcing member 300, and the second connection portion 520 is positioned at the side separating from the battery pack 200 in the bottom portion of the second reinforcing member 400, that is, the first connection portion 510 and the second connection portion 520 are positioned at two sides of the first reference plane W1.

Although the respective embodiments and modifications of the present disclosure have been described above, the technical scope of the present disclosure is not limited to the above-described embodiments, and configurations in the respective embodiments and modifications within the scope not departing from the spirit of the present disclosure. It is possible to change the combination of elements, make various changes to each configuration element, or delete each configuration element. The present disclosure is not limited by the above description, and is only limited by the appended claims.

REFERENCE SIGNS LIST 100 vehicle body
110 first connection point
200 battery pack
210 second connection point
300 first reinforcing member
310 cross-connection portion
320 first reinforcing rod
330 second reinforcing rod
331 first strut
332 second strut
340 second mounting base
350 third mounting base
400 second reinforcing member
410 reinforcing portion
420 first mounting base
500 connection bracket
510 first connection portion
511 first installation hole
520 second connection portion
521 second installation hole
530 main bracket
531 groove portion
540 auxiliary bracket
W1 first reference plane
W2 horizontal plane

What is claimed is:

1. A vehicle body reinforcing structure installed in a vehicle including a vehicle body and a battery pack provided in the vehicle body, the vehicle body reinforcing structure comprising:

a first reinforcing member including at least a cross connection portion; and a second reinforcing member including at least a reinforcing portion arranged to extend along a longitudinal direction of a lateral side surface of the battery pack, wherein both the first reinforcing member and the second reinforcing member are arranged along the longitudinal direction of the lateral side surface of the battery pack, the two ends of the first reinforcing member and the second reinforcing member are connected to the vehicle body respectively, the first reinforcing member includes a first reinforcing rod and a second reinforcing rod, and the cross connection portion is formed by the first reinforcing rod and the second reinforcing rod crossing each other, and the first reinforcing rod includes a first bending portion, the first reinforcing rod and the reinforcing portion encircle to form a triangular structure, and/or the second reinforcing rod includes a second bending portion, and the second reinforcing rod and the reinforcing portion encircle to form a triangular structure.

2. The vehicle body reinforcing structure according to claim 1, wherein a central axis of the first reinforcing rod, a central axis of the second reinforcing rod, and a central axis reinforcing portion are on the same plane of a first reference plane.

3. A vehicle body reinforcing structure installed in a vehicle including a vehicle body and a battery pack provided in the vehicle body, the vehicle body reinforcing structure comprising:

a first reinforcing member including at least a cross connection portion; and a second reinforcing member including at least a reinforcing portion arranged to extend along a longitudinal direction of a lateral side surface of the battery pack, wherein both the first reinforcing member and the second reinforcing member are arranged along the longitudinal direction of the lateral side surface of the battery pack, the two ends of the first reinforcing member and the second reinforcing member are connected to the vehicle body respectively, the vehicle body further includes a connection bracket, wherein at least one of the first reinforcing member and the second reinforcing member is connected with the vehicle body via the connection bracket and the battery pack, the connection bracket includes a first connection portion at a first end, and a second connection portion at a second end, the first connection portion is connected with the battery pack, the second connection portion is connected with the vehicle body, the first connection portion is positioned at a first side of a first reference plane, and the second connection portion is positioned at a second side of the first reference plane.

4. A vehicle body reinforcing structure installed in a vehicle including a vehicle body and a battery pack provided in the vehicle body, the vehicle body reinforcing structure comprising:

a first reinforcing member including at least a cross connection portion; and a second reinforcing member including at least a reinforcing portion arranged to extend along a longitudinal direction of a lateral side surface of the battery pack, wherein both the first reinforcing member and the second reinforcing member are arranged along the longitudinal direction of the lateral side surface of the battery pack, the two ends of the first reinforcing member and the second reinforcing member are connected to the vehicle body respectively, the vehicle body reinforcing structure further includes a connection bracket, at least one of the first reinforcing member and the second reinforcing member is connected with the vehicle body via the connection bracket and the battery pack, and the connection bracket includes a covering portion that covers an outside wall of the first reinforcing member or the second reinforcing member connected to the connection bracket.

5. The vehicle body reinforcing structure according to claim 1, wherein an first end of the first reinforcing rod and a first end of the second reinforcing rod are connected with each other to form a first fixing portion, the first reinforcing rod and the second reinforcing rod form a triangular structure with the cross connection portion at the first fixing portion, and/or a second end of the first reinforcing rod and a second end of the second reinforcing rod are connected with each other to form a second fixing portion, and the first reinforcing rod and the second reinforcing rod form the triangular structure with the cross connection portion at the second fixing portion.

6. The vehicle body reinforcing structure according to claim 1, further comprising a first connection bracket and a second connection bracket, wherein the first connection bracket is connected with the first bending portion of the first reinforcing rod and arranged to be inclined toward a direction of an intermediate portion of the reinforcing portion to be connected with the reinforcing portion, the second connection bracket is connected with the second bending portion of the second reinforcing rod and arranged to be inclined toward a direction of the intermediate portion of the reinforcing portion to be connected with the reinforcing portion, and the first bending portion and the second bending portion are positioned at different sides of the cross connection portion.

7. The vehicle body reinforcing structure according to claim 1, wherein the second reinforcing rod includes a first strut and a second strut, and the first strut and the second strut are connected to two sides of the first reinforcing rod so as to form the cross connection portion with the first reinforcing rod.

8. A vehicle comprising the vehicle body reinforcing structure according to claim 1.

9. A vehicle comprising the vehicle body reinforcing structure according to claim 3.

10. A vehicle comprising the vehicle body reinforcing structure according to claim 4.

* * * * *